United States Patent
Watt, Jr. et al.

(10) Patent No.: US 11,093,297 B2
(45) Date of Patent: Aug. 17, 2021

(54) WORKLOAD OPTIMIZATION SYSTEM

(71) Applicant: Dell Products L.P., Round Rock, TX (US)

(72) Inventors: James S. Watt, Jr., Austin, TX (US); Kareemullah Khan Fazal, Austin, TX (US); Mark Owens, Austin, TX (US); Douglas Braga de Alencar, Carlow (IE); Rene Herrero, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 312 days.

(21) Appl. No.: 15/427,867

(22) Filed: Feb. 8, 2017

(65) Prior Publication Data
US 2018/0225155 A1 Aug. 9, 2018

(51) Int. Cl.
*G06F 9/50* (2006.01)

(52) U.S. Cl.
CPC ...... *G06F 9/5083* (2013.01); *G06F 2209/508* (2013.01); *G06F 2209/5011* (2013.01)

(58) Field of Classification Search
CPC . G06F 9/45533–5094; G06F 2209/508; G06F 2209/5011; G06F 9/5083
See application file for complete search history.

(56) References Cited

U.S. PATENT DOCUMENTS

| | | | | |
|---|---|---|---|---|
| 2013/0080814 A1* | 3/2013 | Cong | .................... | G06F 1/3206 713/340 |
| 2013/0179895 A1* | 7/2013 | Calder | .................. | G06F 9/5077 718/104 |
| 2014/0068611 A1* | 3/2014 | McGrath | ............. | G06F 9/45533 718/1 |
| 2016/0103717 A1* | 4/2016 | Dettori | .................. | G06F 9/5072 719/318 |

(Continued)

OTHER PUBLICATIONS

A Framework and Algorithm for Energy Efficient Container Consolidation in Cloud Data Centers Sareh Fotuhi Piraghai, Amir Vahid Dastierdi, Rodrigo N. Calheiros, and Raikumar Buyya Published: 2015.*

(Continued)

*Primary Examiner* — Emerson C Puente
*Assistant Examiner* — Paul V Mills
(74) *Attorney, Agent, or Firm* — Haynes and Boone, LLP

(57) ABSTRACT

A workload optimization system includes a workload manager subsystem that provides a plurality of workloads that each generates a jobs, an agent infrastructure subsystem that includes a first container host hosting a first container having a first agent and that processes jobs generated by at least one of the plurality of workloads, and a workload resource optimization subsystem that monitors a job queue of jobs that were generated by the plurality of workloads and that are to be processed by the first container. The workload resource optimization subsystem then determines whether (Continued)

the job queue satisfies a container generation condition. If so, the workload resource optimization subsystem provides instructions to the first container host to generate a second container that includes a second agent. The workload resource optimization subsystem monitors container host utilization to provide instructions to activate a second container host to provide a third container having a third agent.

17 Claims, 12 Drawing Sheets

(56) References Cited

U.S. PATENT DOCUMENTS

| | | | | |
|---|---|---|---|---|
| 2016/0162320 | A1* | 6/2016 | Singh | G06F 9/5055 718/1 |
| 2016/0205518 | A1* | 7/2016 | Patel | H04L 67/1002 455/518 |
| 2016/0378519 | A1* | 12/2016 | Gaurav | G06F 9/5077 718/1 |
| 2017/0180346 | A1* | 6/2017 | Suarez | G06F 8/71 |
| 2017/0339158 | A1* | 11/2017 | Lewis | H04L 63/104 |
| 2018/0039524 | A1* | 2/2018 | Dettori | G06F 9/505 |

OTHER PUBLICATIONS

Elastic Application Container: A Lightweight Approach for Cloud Resource Provisioning Sijin He, Li Guo, Yike Guo, Chao Wu, Moustafa Ghanem, Rui Han Published: 2012.*

Elastic Site Using Clouds to Elastically Extend Site Resources Paul Marshall, Kate Keahey and Tim Freeman (Year: 2010).*

FitScale: Scalability of Legacy Applications Through Migration to Cloud Jinho Hwang(B), Maja Vukovic, and Nikos Anerousis (Year: 2016).*

Auto-scaling Techniques for Elastic Applications in Cloud Environments Tania Lorido-Botran, Jose Miguel-Alonso, Jose A. Lozano University of the Basque Country, Technical Report EHU-KAT-IK-09-12 (Year: 2012).*

Dynamic Business Metrics-driven Resource Provisioning in Cloud Environments Pawel Koperekand Wlodzimierz Funika (Year: 2012).*

Predictive Pod Auto-scaling in the Kubernetes Container Cluster Manager Matt McNaughton (Year: 2016).*

Efficiency Analysis of Provisioning Microservices Hamzeh Khazaei, Cornel Barna, Nasim Beigi-Mohammadi, Marin Litoiu (Year: 2016).*

Four-Fold Auto-Scaling on a Contemporary Deployment Platform Using Docker Containers Philipp Hoenisch, Ingo Weber, Stefan Schulte, Liming Zhu, Alan Fekete (Year: 2015).*

Slacker: Fast Distribution with Lazy Docker Containers Tyler Harter, Brandon Salmon, Rose Liu, Andrea C. Arpaci-Dusseau (Year: 2016).*

What is a Container Registry? Haining Zhang VMware Cloud Native Blog https://blogs.vmware.com/cloudnative/2017/06/21/what-is-a-container-registry/ (Year: 2017).*

Amazon EC2 Container Service—Developer Guide Amazon Web Services, Inc.; API Version Nov. 13, 2014 p. 1-167 (Year: 2016).*

An elastic virtual infrastructure for research applications (ELVIRA) Alex Voss, Adam Barker, Mahboubeh Asgari-Targhi, Adriaan van Ballegooijen and Ian Sommerville (Year: 2013).*

Maarten Balliaw, "Introducing TeamCity Azure Plugin—Run Builds in the Cloud, TeamCity Blog," Nov. 3, 2014, pp. 1-5, https://blog.ietbrains.com/teamcity/2014/11/introducing-teamcity-azure-plugin-run-builds-in-the-cloud/.

"Travis CI—Test and Deploy Your Code With Confidence," pp. 1-10, Travis CI, Gmbh, Berlin, Germany, https://travis-ci.org/.

"Continuous Integration With Docker—Shippable, Accelerate Software Innovation," 2017, pp. 1-4, Shippable, Inc., https://app.shippable.com/.

"Docker—Build, Ship, and Run Any App, Anywhere," 2016, pp. 1-8, Docker Inc., https://www.docker.com.

* cited by examiner

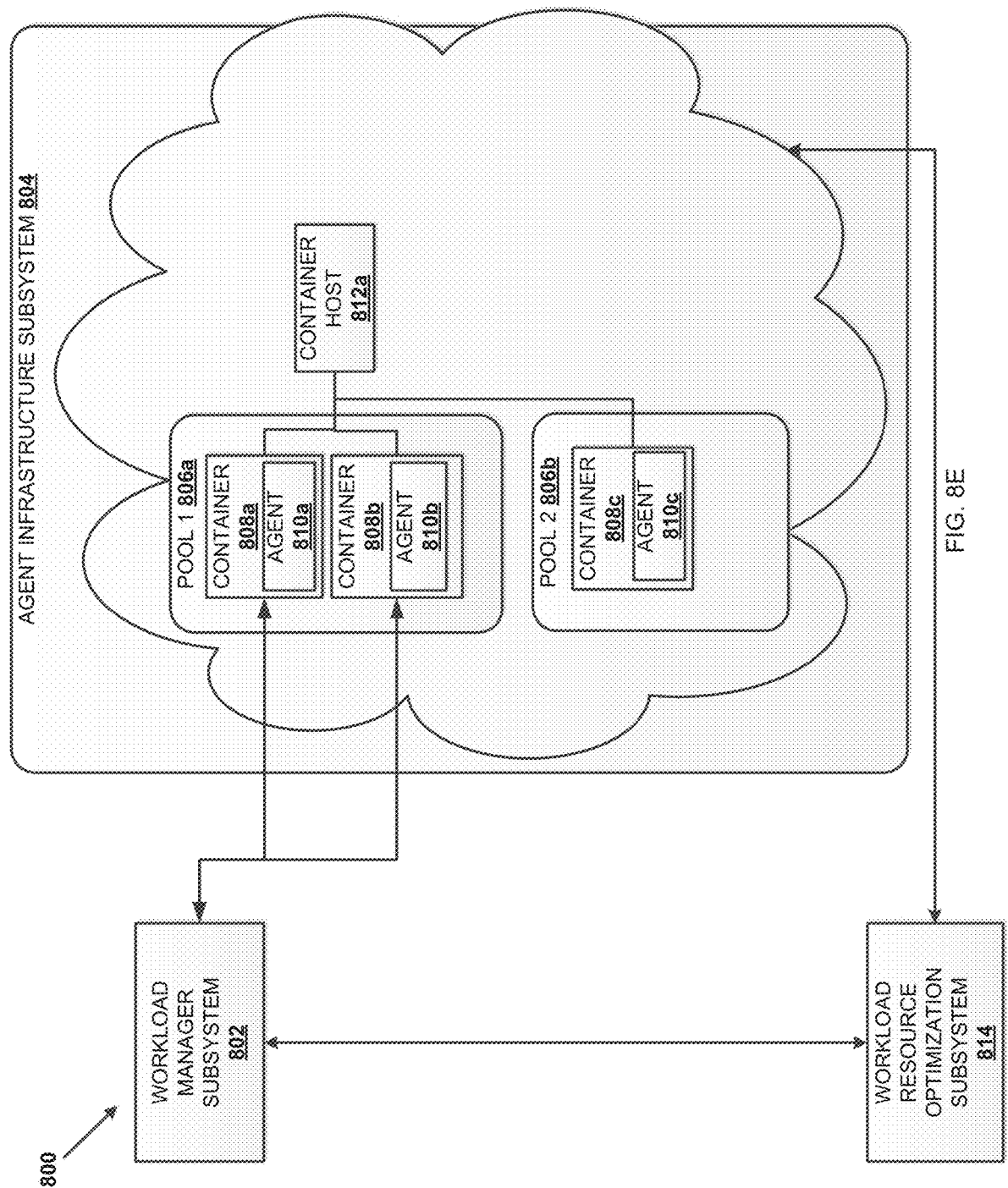

WORKLOAD OPTIMIZATION SYSTEM

BACKGROUND

The present disclosure relates generally to information handling systems, and more particularly to a workload optimization system that dynamically activates and deactivates container hosts and associated containers that provide agents for processing jobs.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are often used in workload execution products such as continuous integration solutions that are provided for software development. Workload execution products may be used to catalog workloads (e.g., sets of instructions), and farm out corresponding jobs (e.g., instances of a workload) to agents that are configured to run particular jobs. Workload execution products may provide agent pools that are created on one or more information handling systems to execute a particular workload or set of workloads with similar prerequisites. A workload manager may then assign jobs to the agent pools as the jobs are generated, and if all agents are busy, the workload manager will queue the jobs and wait for the agents to become available.

Under certain conditions, job queues may become particularly long and result in queue times that are unsatisfactory to the user. This is especially true when one or more agents are created to perform all or most of the workloads, as a limited number of processing and memory resources are available to process jobs. Furthermore, with such systems that include limited number of agents, the configuration of the agents that can perform all or most of the workloads can become unmanageable and hard to reproduce and track. To alleviate such issues, custom agents for individual workloads are often used. However, such custom agents increase the hardware footprint of the agent infrastructure, as a greater number of servers are needed to provision custom agents. Furthermore, memory and processing resources are often wasted with high idle times that are associated with provisioning an often redundant number of agents that are needed to head off any significant queue times.

Accordingly, it would be desirable to provide an improved workload optimization system.

SUMMARY

According to one embodiment, an information handling system (IHS) includes a communication system; a processing system that is coupled to the communication system; and a memory system that is coupled to the processing system and that includes instructions that, when executed by the processing system, cause the processing system to provide a workload resource optimization engine that is configured to: monitor a job queue of jobs included on a workload manager subsystem, wherein the jobs were generated by a plurality of workloads on the workload manager subsystem and are to be processed by a first container on an agent infrastructure subsystem that is coupled to the workload manager subsystem, and wherein the agent infrastructure subsystem includes a first container host that is configured to provide the first container having a first agent and that is configured to process a job generated by at least one of the plurality of workloads, wherein the first agent facilitates communications of the job between the first container and the workload manager subsystem; determine that the job queue satisfies a container generation condition and, in response, provide instructions to the first container host to generate a second container that includes a second agent; monitor a first container host utilization of the first container host that is based at least in part on a container utilization of the first container and the second container; and determine the first container host utilization of the first container host satisfies a container host activation condition and, in response, provide instructions to the agent infrastructure subsystem to activate a second container host that that is configured to provide a third container having a third agent.

BRIEF DESCRIPTION OF THE DRAWINGS

FIG. 8E is a schematic view illustrating an embodiment of the workload optimization system of FIG. 8A removing a container host from the agent infrastructure subsystem during the method of FIG. 7

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
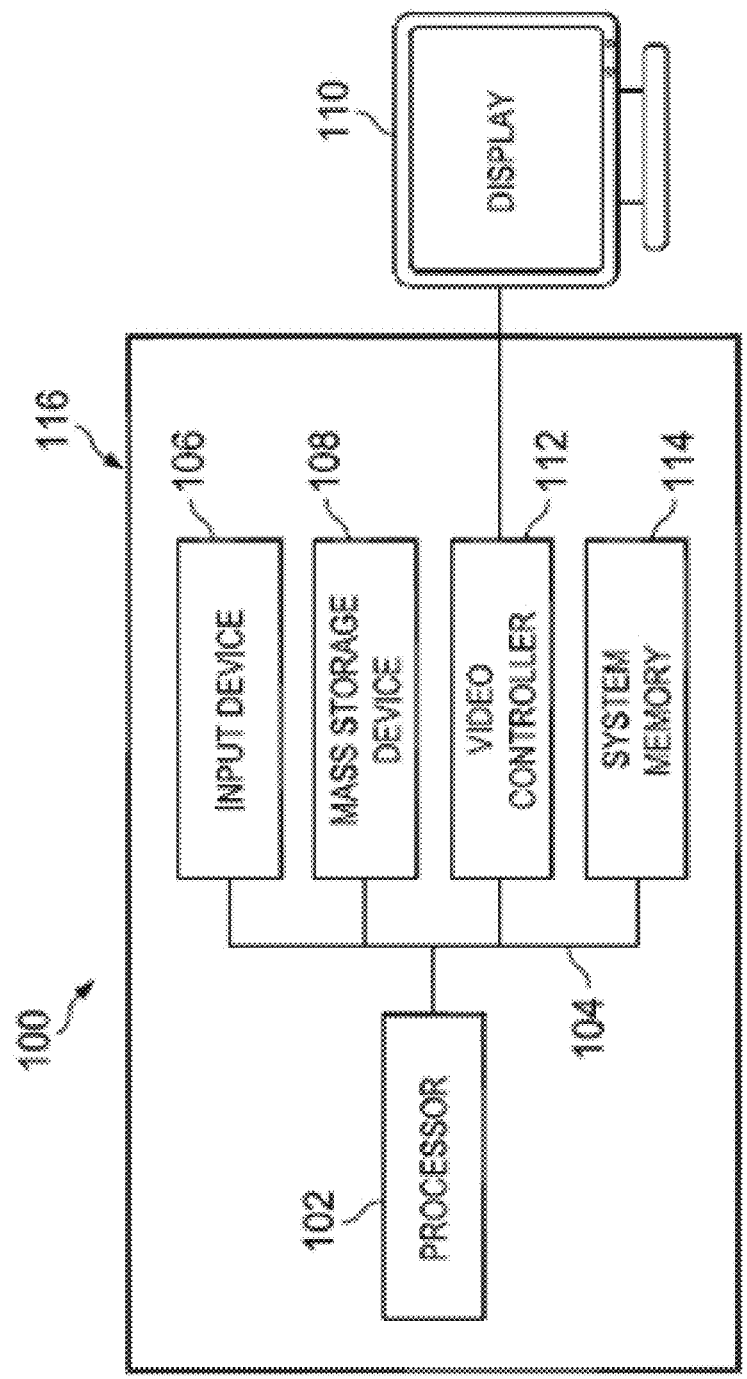
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
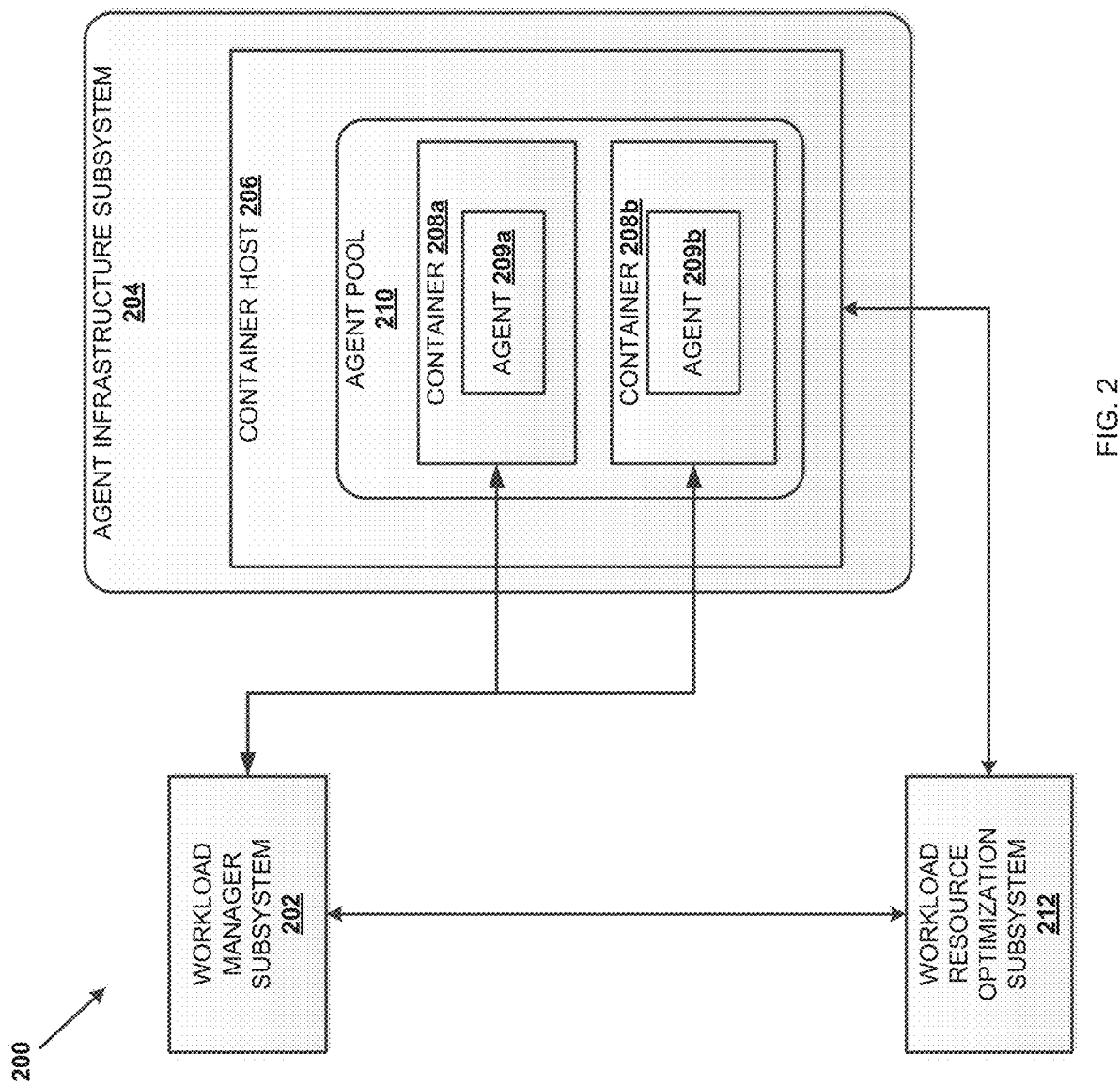
FIG. 2 is a schematic view illustrating an embodiment of a workload optimization system.

Referring now to FIG. 2, an embodiment of a workload optimization system 200 is illustrated. The workload optimization system 200 includes a workload manager subsystem 202 that may be the IHS 100 discussed above with reference to FIG. 1, and/or may include some or all of the components of the IHS 100. For example, the workload manager subsystem 202 may include one or more server devices and/or other computing devices (e.g., desktop computing device(s), laptop/notebook computing device(s), tablet computing device(s), mobile phone(s), etc.) known in the art.

The workload manager subsystem 202 is coupled to an agent infrastructure subsystem 204 that may be the IHS 100 discussed above with reference to FIG. 1, and/or may include some or all of the components of the IHS 100. For example, the agent infrastructure subsystem 204 may include one or more server devices and/or other computing devices (e.g., desktop computing device(s), laptop/notebook computing device(s), tablet computing device(s), mobile phone(s), etc.) known in the art. Each of the server devices and/or other computing devices in the agent infrastructure subsystem 204 may be a container host 206 and/or provide one or more container hosts 206. The container host 206 includes at least one container such as the container 208*a* and the container 208*b* illustrated in FIG. 2. Each container 208*a-b* may be provided by an isolated user-space virtualization instance that runs on top of an operating system included on the agent infrastructure subsystem 204. Each container 210*a-b* may provide an isolated execution space for an agent, such as the agent 209*a* and the agent 209*b*, respectively, illustrated in FIG. 2, and those agents 209*a-b* may act as a proxy to facilitate communication between the workload manager subsystem 202 and the container on which the agent 209*a-b* is hosted such that the containers 208*a-b* process jobs generated by workloads provided by the workload manager subsystem 202. Thus, the containers 208*a-b* can be grouped in an agent pool 210 if the containers 208*a-b* include agents 209*a-b* and are configured to process a particular set of workload jobs (e.g., jobs having similar prerequisites.) In other embodiments, when the containers 208*a-b* are configured to process a set of different types of jobs (e.g., jobs without similar prerequisites), the container 208*a* hosting the agent 209*a* may be in a first agent pool, while the container 208*b* and the agent 209*b* is in a second agent pool. In an embodiment, if the agent infrastructure subsystem 204 includes a second container host, the agent pool 210 may span the container host 206 and the second container host to include containers that are configured to process a particular set of workload jobs. In an embodiment, the workload manager subsystem 202 may communicate with each agent 209*a-b* over a dedicated, network connection through a physical port and/or a virtual port provided for the container host 206 and a virtual port provided for each of the containers 208*a-b*. While a specific embodiment of the agent infrastructure subsystem 204 is illustrated in FIG. 2, one of skill in the art in possession of the present disclosure will recognize that the agent infrastructure subsystem of the present disclosure may be provided by a variety of container host, container, and agent pool configurations while remaining within the scope of the present disclosure.

Both the workload manager subsystem 202 and the agent infrastructure subsystem 204 are coupled to a workload resource optimization subsystem 212 that may be the IHS 100 discussed above with reference to FIG. 1, and/or may include some or all of the components of the IHS 100. For example, the workload resource optimization subsystem 212 may include one or more server devices and/or other computing devices (e.g., desktop computing device(s), laptop/notebook computing device(s), tablet computing device(s), mobile phone(s), etc.) known in the art. As discussed below, the workload resource optimization subsystem 212 is configured to monitor the performance of the workload manager subsystem 202 and the agent infrastructure subsystem 204, and communicate instructions to the workload manager subsystem 202 and the agent infrastructure subsystem 204 based on the monitored performance.

Figure 3:
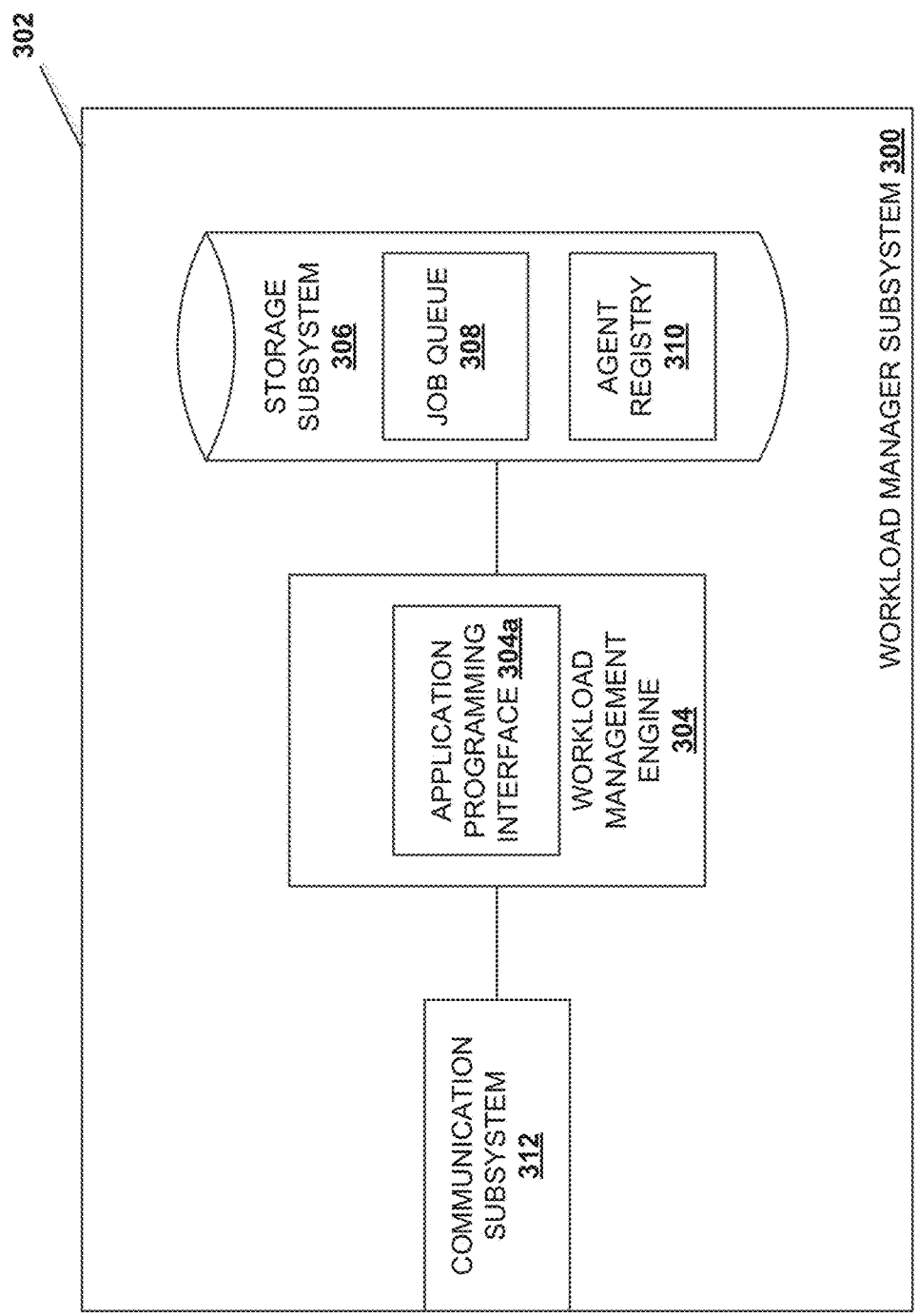
FIG. 3 is a schematic view illustrating an embodiment of a workload manager subsystem used in the workload optimization system of FIG. 2.

Referring now to FIG. 3, an embodiment of a workload manager subsystem 300 is illustrated that may be the workload manager subsystem 202 discussed above with reference to FIG. 2. As such, the workload manager subsystem 300 may be the IHS 100 discussed above with reference to FIG. 1, and/or may include some or all of the components of the IHS 100. As discussed above, while the workload manager subsystem 300 is described as being a server computing device, the workload manager subsystem 300 may be provided by desktop computing devices, mobile computing devices, and/or a variety of other computing devices that would be apparent to one of skill in the art in possession of the present disclosure. In the illustrated embodiment, the workload manager subsystem 300 includes a chassis 302 that houses the components of the workload manager subsystem 300, only some of which are illustrated in FIG. 3. For example, the chassis 302 may house a processing system (not illustrated, but which may be provided by the processor 102 discussed above with reference to FIG. 1) and a memory system (not illustrated, but which may be provided by the memory 114 discussed above with reference to FIG. 1) that includes instructions that, when executed by the processing system, cause the processing system to provide a workload management engine 304 that is configured to perform the functions of the workload management engines and workload manager subsystems discussed below. In the illustrated embodiment, the workload management engine 304 operates according to an application programming interface (API) 304a that is provided for workload manager subsystem 300. For example, the API 304a may be APIs such as those provided by TeamCity® (currently available at www-.jetbrains.com/teamcity/), Jenkins® (currently available at jenkins.io) Integration Operations Management JP1 by Hitachi®, and/or any other API provider providing APIs that provides workload automation and management.

The chassis 302 also houses a storage device (not illustrated, but which may be the storage device 108 discussed above with reference to FIG. 1) that is coupled to the workload management engine 304 (e.g., via a coupling between the storage device and the processing system) and that includes a storage subsystem 306 that is configured to store the rules and/or other data utilized by the workload management engine 304 to provide the functionality discussed below. The storage subsystem 306 includes a job queue 308 that is configured to store jobs that have been generated by workloads provided by the workload management engine 304, and that are waiting to be processed by one or more of the agents 209a-b in the agent infrastructure subsystem 204 described above with reference to FIG. 2. Agent and/or container information such as network addresses, job processing capabilities, an agent location, communication protocols, a spinning up command, a spinning down command, agent and/or container host capacity and/or other agent/container information that is known in the art for managing workloads, is stored in an agent registry 310 and used by the workload management engine 304 for assigning jobs to the agents 209a-b. The chassis 302 also houses a communication subsystem 312 that is coupled to the workload management engine 304 (e.g., via a coupling between the communication subsystem 312 and the processing system), and that may include a network interface controller (NIC), a wireless communication subsystem, and/or other communication subsystems known in the art. While specific components of the workload manager subsystem 300 have been illustrated and described, one of skill in the art in possession of the present disclosure will recognize that other components may be included in the chassis 302 and utilized to perform both the functionality described below as well as conventional workload manager subsystem functionality while remaining within the scope of the present disclosure.

Figure 4:
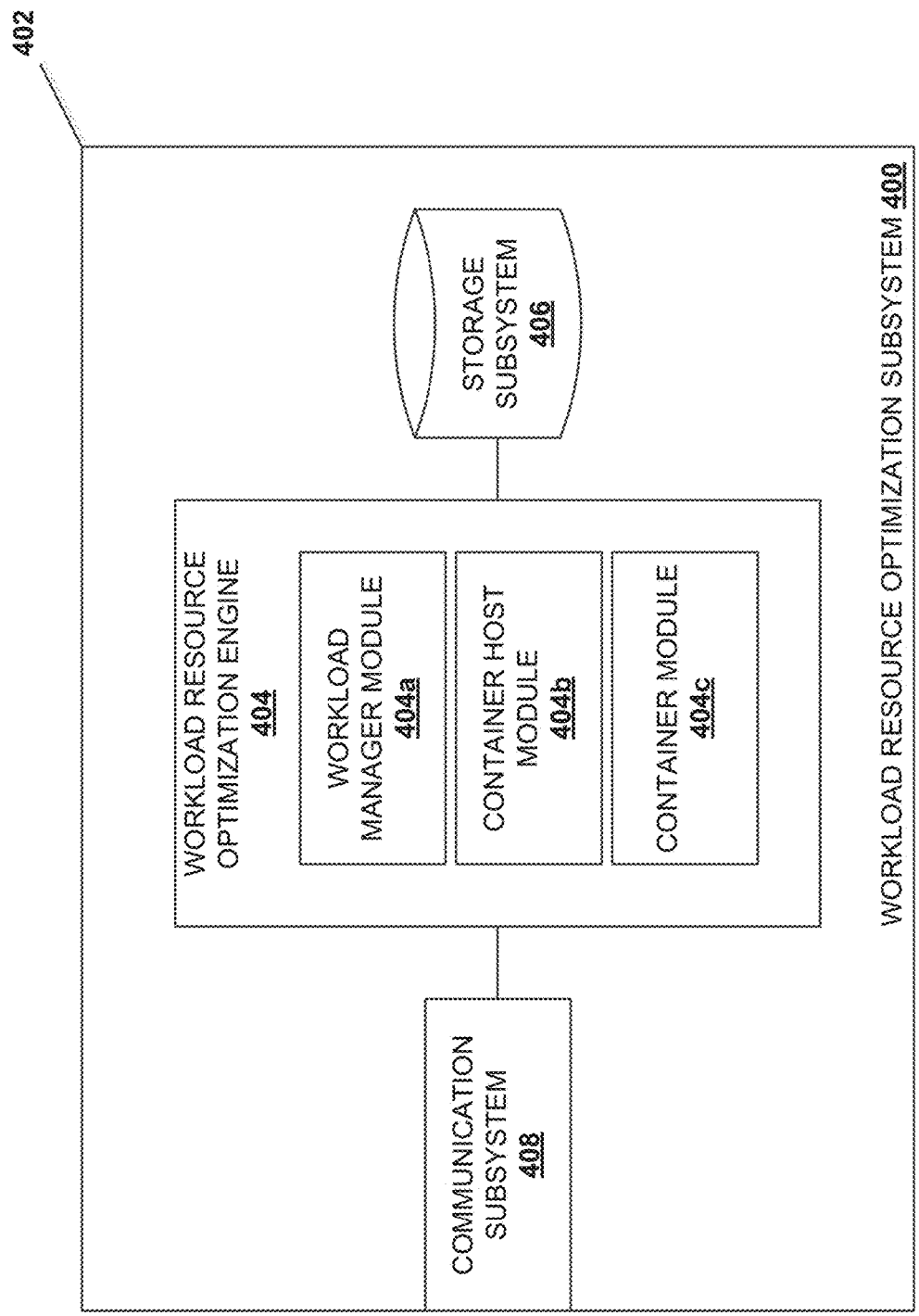
FIG. 4 is a schematic view illustrating an embodiment of a workload resource optimization subsystem used in the workload optimization system of FIG. 2.

Referring now to FIG. 4, an embodiment of a workload resource optimization subsystem 400 is illustrated that may be the workload resource optimization subsystem 212 discussed above with reference to FIG. 2. As such, the workload resource optimization subsystem 400 may be the IHS 100 discussed above with reference to FIG. 1, and/or may include some or all of the components of the IHS 100. As discussed above, while the workload resource optimization subsystem 400 is described as being a server computing device, the workload resource optimization subsystem 400 may be provided by desktop computing devices, mobile computing devices, and/or a variety of other computing devices that would be apparent to one of skill in the art in possession of the present disclosure. In the illustrated embodiment, the workload resource optimization subsystem 400 includes a chassis 402 that houses the components of the workload resource optimization subsystem 400, only some of which are illustrated in FIG. 4. For example, the chassis 402 may house a processing system (not illustrated, but which may be provided by the processor 102 discussed above with reference to FIG. 1) and a memory system (not illustrated, but which may be provided by the memory 114 discussed above with reference to FIG. 1) that includes instructions that, when executed by the processing system, cause the processing system to provide a workload resource optimization engine 404 that is configured to perform the functions of the workload resource optimization engines and the workload resource optimization subsystems discussed below. In the illustrated example, the workload resource optimization engine 404 may include a workload management module 404a that is configured to communicate with various workload manager APIs (e.g., the API 304a of FIG. 3). The workload resource optimization engine 404 may also include a container host module 404b that is configured to communicate with the various container host APIs discussed below. Furthermore, the workload resource optimization engine 404 may also include a container module 404c that is configured to communicate with the various container APIs discussed below.

The chassis 402 also houses a storage device (not illustrated, but which may be the storage device 108 discussed above with reference to FIG. 1) that is coupled to the workload resource optimization engine 404 (e.g., via a coupling between the storage device and the processing system) and that includes a storage subsystem 406 that is configured to store the rules and/or other data utilized by the workload resource optimization engine 404 to provide the functionality discussed below. The chassis 402 also houses a communication subsystem 408 that is coupled to the workload resource optimization engine 404 (e.g., via a coupling between the communication subsystem 408 and the processing system), and that may include a network interface controller (NIC), a wireless communication subsystem, and/or other communication subsystems known in the art. While specific components of the workload manager subsystem 300 have been illustrated and described, one of skill in the art in possession of the present disclosure will recognize that other components may be included in the chassis 402 and utilized to perform the functionality described below while remaining within the scope of the present disclosure.

Figure 5:
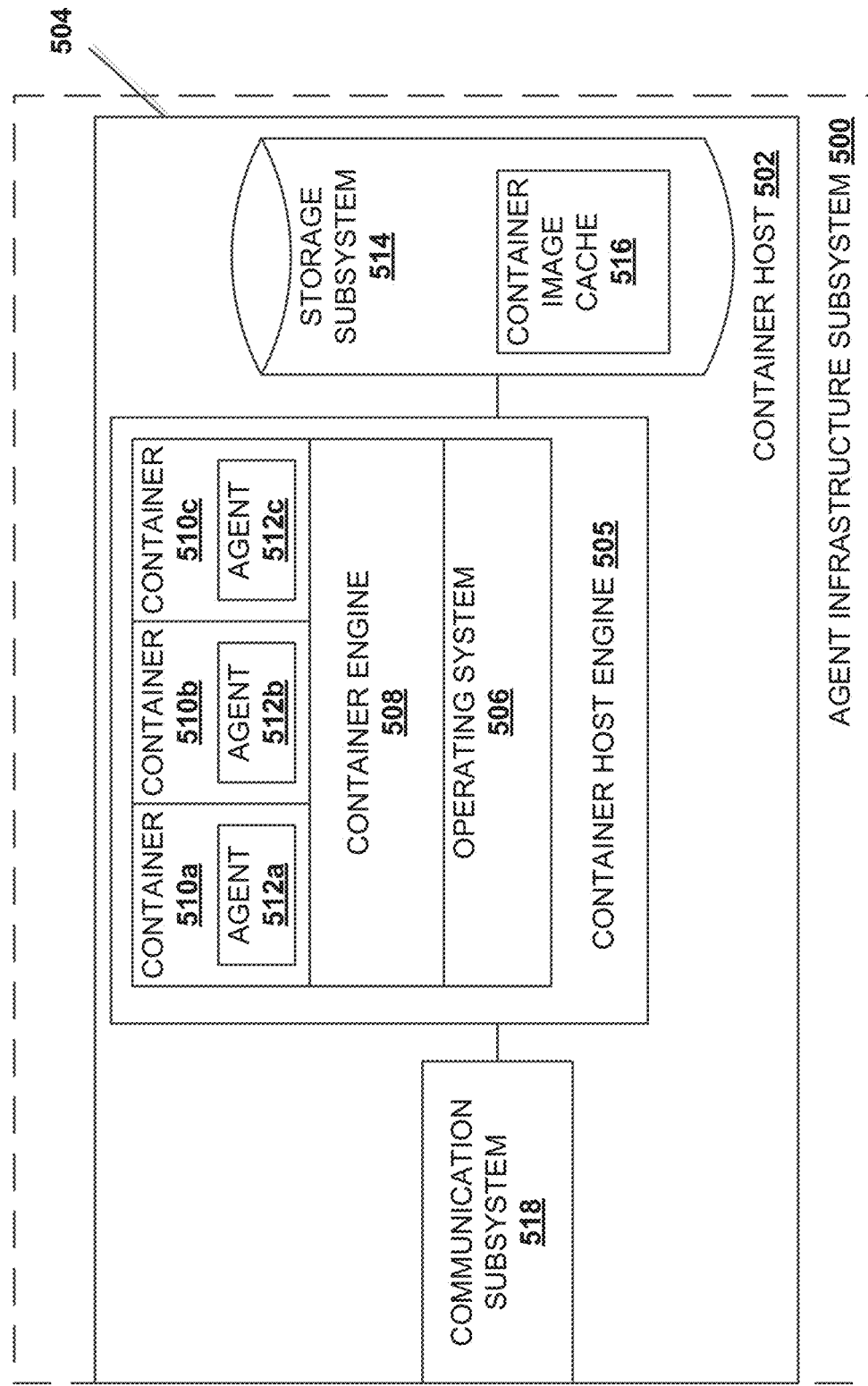
FIG. 5 is a schematic view illustrating an embodiment of an agent infrastructure subsystem used in the workload optimization system of FIG. 2.

Referring now to FIG. 5, an embodiment of an agent infrastructure subsystem 500 is illustrated that may be the agent infrastructure subsystem 204 discussed above with reference to FIG. 2. As such, the agent infrastructure subsystem 500 may be the IHS 100 discussed above with reference to FIG. 1, and/or may include some or all of the components of the IHS 100. In an embodiment, the agent infrastructure subsystem 500 may include one or more container hosts 502 that may be the container host 206 discussed above with reference to FIG. 2. As discussed above, while the container host 502 is described as being a server computing device, the container host 502 may be provided by desktop computing devices, mobile computing devices, virtual machines hosted by the a physical agent infrastructure subsystem as discussed below in FIG. 6, and/or a variety of other computing devices that would be apparent to one of skill in the art in possession of the present disclosure. In the illustrated embodiment, the container host 502 includes a chassis 504 that houses the components of the container host 502, only some of which are illustrated in FIG. 5. For example, the chassis 504 may house a processing system (not illustrated, but which may be provided by the processor 102 discussed above with reference to FIG. 1) and a memory system (not illustrated, but which may be provided by the memory 114 discussed above with reference to FIG. 1) that includes instructions that, when executed by the processing system, cause the processing system to provide a container host engine 505 that includes an operating system 506 and a container engine 508 that are configured to perform the functions of the container host engine, the operating system, the container engine, and the container host discussed below. In the illustrated example, the container engine 508 (e.g., a container engine available from Docker®/Docker Swarm® (currently available at www.docker.com), Rancher®, Windows Server 2016 Containers, and/or other container APIs known in the art) may generate one or more containers (e.g., the container 510a, the container 510b, and the container 510c illustrated in FIG. 5) for the operating system 506. For example, the containers 510a-c generated by the container engine 508 may be provided by isolated user-space virtualization instances that run on top of the operating system 506. The containers 510a-c are provisioned from a container file which specifies prerequisites a container needs to process a job for which the container is being provisioned. In an embodiment, any of the containers 510a-c may be configured with an agent (e.g., the agent 512a, the agent 512b, and the agent 512c, respectively, illustrated in FIG. 5). In some embodiments, each of the agents 512a-512c may be the same or substantially similar (e.g., configured to facilitate communication between the workload manager subsystem and the container of an agent pool) such that they are grouped in the same agent pool, or different enough (e.g., configured to process jobs with different prerequisites) such that the agents 512a-c belong to different agent pools.

The chassis 504 also houses a storage device (not illustrated, but which may be the storage device 108 discussed above with reference to FIG. 1) that is coupled to the operating system 506 and container engine 508 (e.g., via a coupling between the storage device and the processing system) and that includes a storage subsystem 514 that is configured to store the rules and/or other data utilized by the operating system 506 and the container engine 508 to provide the functionality discussed below. In an embodiment, the storage subsystem 514 includes a container image cache 516 that stores a container image of the containers 510a-c and agents 512a-c that are provisioned in the containers 510a-c. In some examples, the container engine 508 may use the container images that were created for previously provisioned containers and that are stored in the container image cache 516 for provisioning new agents in the containers 510a-c. While the container image cache 516 is illustrated as stored in the storage subsystem 514, the container image cache 516 may be stored in a storage device that is separate from the chassis 504 and coupled to the container host engine 505 through a network via a communication subsystem 518, discussed below, and that allows the container host 502 and other container hosts included in the agent infrastructure subsystem 500 to access the container image cache 516 without having to store that container image cache directly on the system that includes that container host. The chassis 504 also houses the communication subsystem 518 that is coupled to the container host engine 505 (e.g., via a coupling between the communication subsystem 518 and the processing system), and that may include a network interface controller (NIC), a wireless communication subsystem, and/or other communication subsystems known in the art. While specific components of the agent infrastructure subsystem 500 including a container host 502 have been illustrated and described, one of skill in the art in possession of the present disclosure will recognize that other components may be included in the chassis 504 and utilized to perform both the functionality described below as well as conventional container host functionality while remaining within the scope of the present disclosure.

Figure 6:
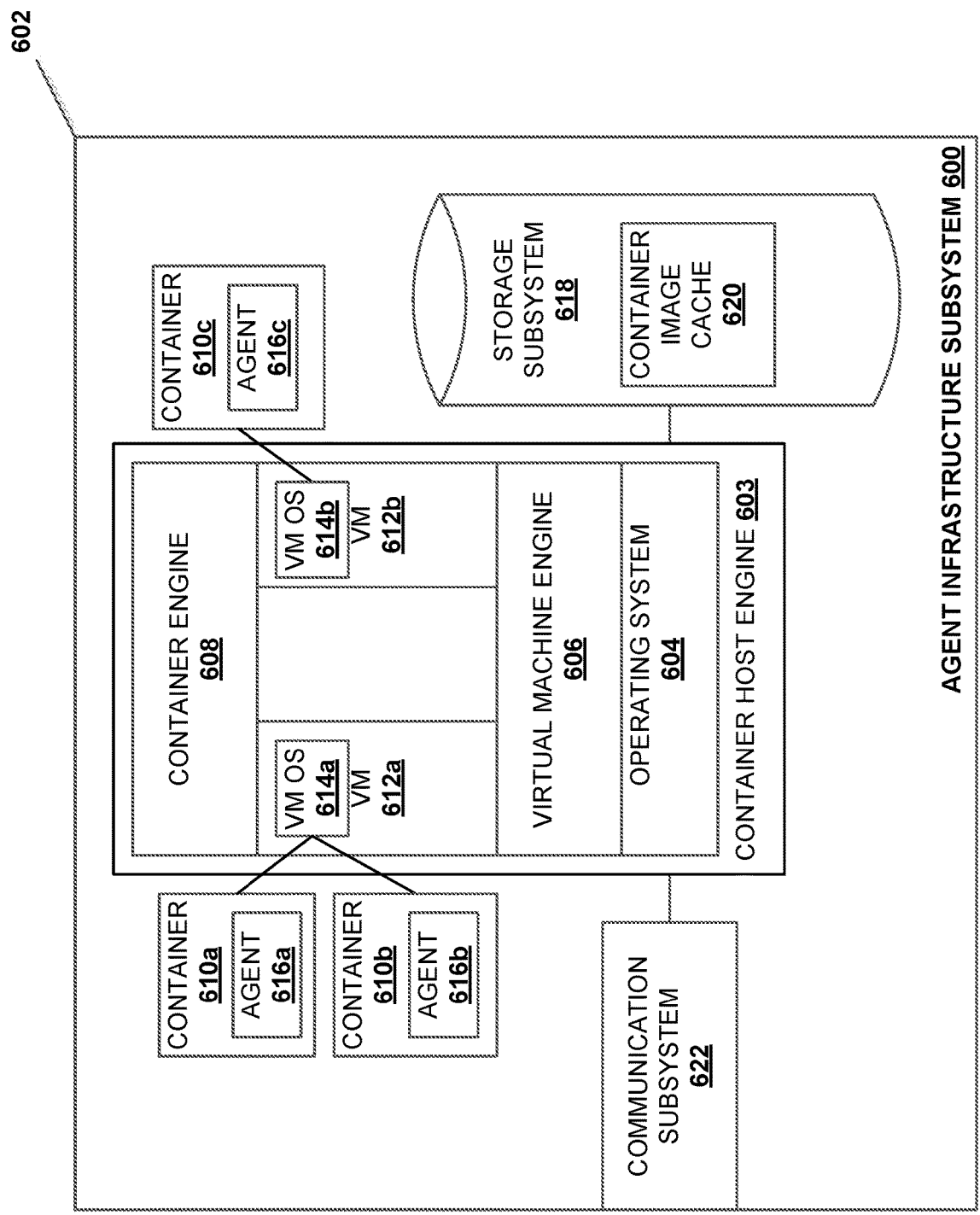
FIG. 6 is a schematic view illustrating an embodiment of a container host used in the workload optimization system of FIG. 2.

Referring now to FIG. 6, an embodiment of an agent infrastructure subsystem 600 is illustrated that may be the agent infrastructure subsystem 204 discussed above with reference to FIG. 2. As such, the agent infrastructure subsystem 600 may be the IHS 100 discussed above with reference to FIG. 1, and/or may include some or all of the components of the IHS 100. As discussed above, while the agent infrastructure subsystem 600 is described as being a client computing device, the agent infrastructure subsystem 600 may be provided by desktop computing devices, server computing devices, mobile computing devices, and/or a variety of other computing devices that would be apparent to one of skill in the art in possession of the present disclosure. In the illustrated embodiment, the agent infrastructure subsystem 600 includes a chassis 602 that houses the components of the agent infrastructure subsystem 600, only some of which are illustrated in FIG. 6. For example, the chassis 602 may house a processing system (not illustrated, but which may be provided by the processor 102 discussed above with reference to FIG. 1) and a memory system (not illustrated, but which may be provided by the memory 114 discussed above with reference to FIG. 1) that includes instructions that, when executed by the processing system, cause the processing system to provide a container host engine 603 that includes an operating system 604, a virtual machine engine 606, and container engine 608 that are configured to perform the functions of container host engines, operating systems, virtual machine engines, container engines, and agent infrastructure subsystems discussed below.

The agent infrastructure subsystem 600 is similar to the agent infrastructure subsystem 500 discussed above with reference to FIG. 5, with the exception that the agent infrastructure subsystem 600 includes another level of virtualization such that, in the illustrated example, the container engine 608 may provide one or more containers (e.g., the container 610a, the container 610b, and the container 610c illustrated in FIG. 6) that are generated from a virtual machine operating system (e.g., the virtual machine operating system 614a and the virtual machine operating system 614b illustrated in FIG. 6) that is executed on a virtual machine (e.g., the virtual machine 612a and the virtual machine 612b, respectively, illustrated in FIG. 6). As illustrated, each of the virtual machines 612a-b are created and executed by the virtual machine engine 606 (e.g., a hypervisor or other virtual machine monitor (VMM) known in the art) that runs on hardware and/or the operating system 604 of the agent infrastructure subsystem 600. As such, each virtual machine 612a-b and virtual machine operating system 614 may emulate the container host 502 of FIG. 5. In an embodiment and as discussed above, each of the containers 610a-c may be configured with a respective agent (e.g., the agent 616a, the agent 616b, and the agent 616c illustrated in FIG. 6), which may be the same or different agents that are configured to execute a particular job created by the workload manager subsystem 202 of FIG. 2.

The chassis 602 also houses a storage device (not illustrated, but which may be the storage device 108 discussed above with reference to FIG. 1) that is coupled to the container host engine 603 (e.g., via a coupling between the storage device and the processing system) and that includes a storage subsystem 618 that is configured to store the rules and/or other data utilized by the container host engine 603 to provide the functionality discussed below. In an embodiment, the storage subsystem 618 includes a container image cache 620 that stores container images of the containers 610a-c and agents 616a-c that are created in the containers 610a-c. The container engine 608 may use the container images of previously provisioned containers that are stored in the container image cache for provisioning new agents in containers 610a-c. The chassis 602 also houses a communication subsystem 622 that is coupled to the container host engine 603 (e.g., via a coupling between the communication subsystem 622 and the processing system), and that may include a network interface controller (NIC), a wireless communication subsystem, and/or other communication subsystems known in the art. While specific components of the agent infrastructure subsystem 600 have been illustrated and described, one of skill in the art in possession of the present disclosure will recognize that other components may be included in the chassis 602 and utilized to perform both the functionality described below as well as conventional agent infrastructure subsystem functionality while remaining within the scope of the present disclosure.

Figure 7:
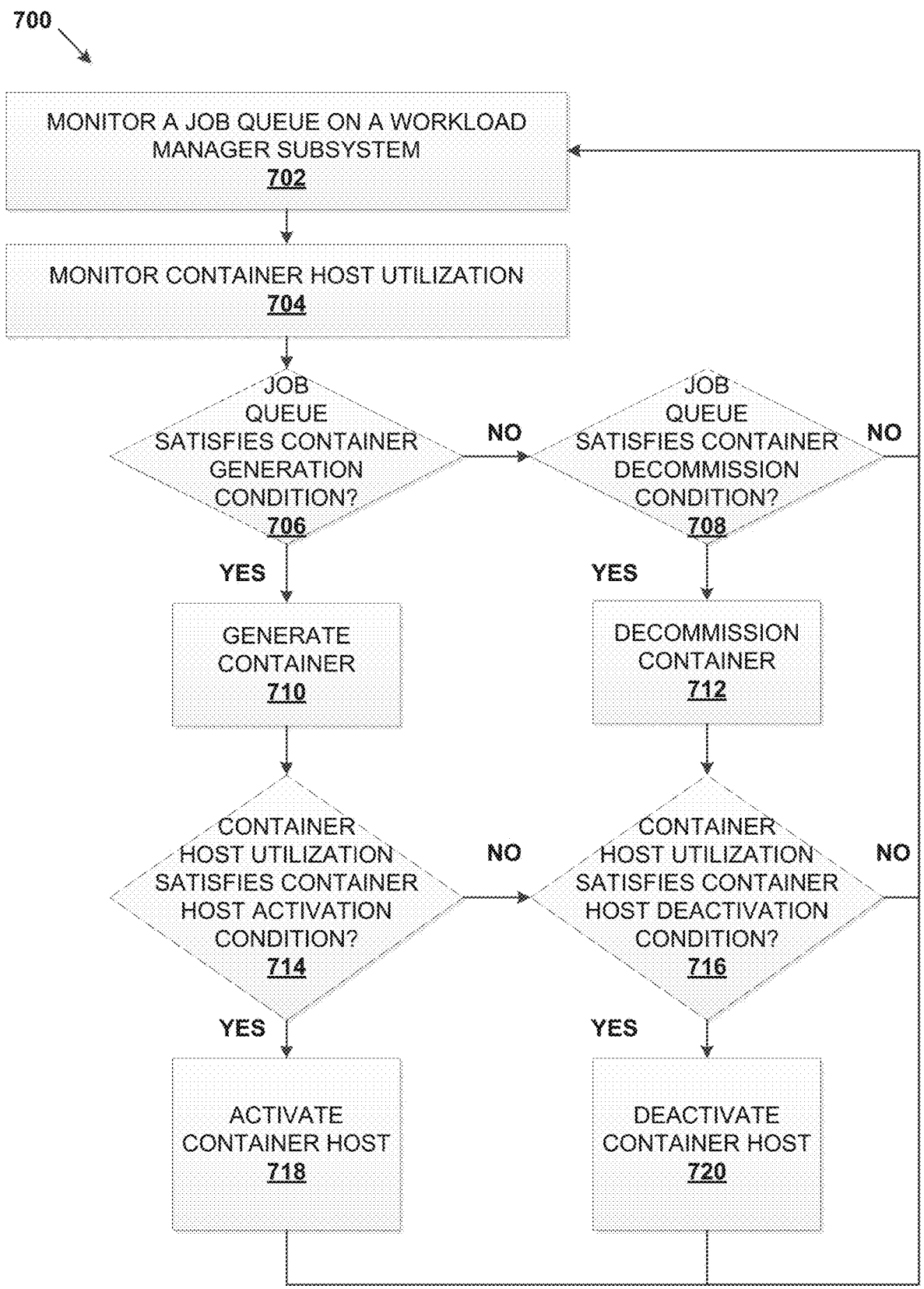
FIG. 7 is a flow chart illustrating an embodiment of a method for workload optimization.

Referring now to FIG. 7, an embodiment of a method 700 for workload resource optimization is illustrated. As discussed below, the systems and methods of the present disclosure provide a workload optimization system that includes a workload resource optimization subsystem that monitors and manages a workload manager subsystem that creates and manages jobs generated by workloads, and an agent infrastructure subsystem that includes one or more agents that process those jobs. The workload resource optimization engine uses job queue information from the workload manager subsystem to scale up and scale down container hosts and/or containers hosted by the container hosts such that the containers dynamically provide instances of agents on the agent infrastructure subsystem to facilitate communication with the workload manager subsystem for processing the jobs by the container. By implementing scaling of containers and container hosts, information technology departments can substantially reduce their hardware footprints by requiring less hardware resources to provision customized agents that can process a variety of different jobs, while simultaneously reducing job queue times at the workload manager subsystem, as well as agent provisioning times.

The method 700 begins at block 702 where a job queue of a workload manager subsystem is monitored. Prior to or during block 702, the workload manager subsystem 202 may receive a plurality of workload requests that cause the workload manager subsystem 202 to provide a plurality of workloads that begin generating jobs when one or more of the plurality of workloads is executed. In an embodiment, an agent pool 210, which includes at least one of the agents 209a-b that is configured to facilitate communication with the workload manager subsystem 202 for processing, on the containers 208a-b, the jobs generated from the executing workload(s) on the workload manager subsystem 202, may have been provisioned in the agent infrastructure subsystem 204 prior to the jobs being generated at the workload manager subsystem 202. The workload manager subsystem 202 then selects the agent pool 210 based on the job and/or the workload in order to provide for the processing of the job, and determines whether one or more of the containers 208a-b is available in the agent pool 210. If one or more of the containers 208a-b in the agent pool 210 is available, the workload manager subsystem 202 sends the job to the agent(s) that are available so that those containers hosting the agents may process that job. If none of the containers 208a-b in the agent pool 210 are available, the workload manager subsystem 202 queues the job in the job queue 308 until one or more of the containers 208a-b become available. While the containers 208a-b and the agent pool 210 are provisioned prior to job(s) being generated that are to be processed by those containers 208a-b and that agent pool 210, one of skill in the art would recognize that the agent pool 210, containers 208a-b, and agents 209a-b hosted by the containers 208a-b may be provisioned subsequent to the generation of job(s) (by a workload executed on the workload manager subsystem 202) that are to be processed by those containers 208a-b and that agent pool 210. Thus, the workload manager subsystem 202 may store jobs in the job queue 308 until an agent pool 210 is provisioned. Therefore, while the method 700 is described as being performed with the containers 208a-b and the agents pool 210 already existing on the agent infrastructure subsystem 204, one of skill in the art in possession of the present disclosure will recognize that the method 700 may begin with no agent pools 210 and/or containers having been provisioned on the agent infrastructure subsystem 204.

In an embodiment, at block 702 the workload resource optimization subsystem 212 monitors the workload manager subsystem 202 and/or the job queue 308 of the workload manager subsystem 202. For example, the workload resource optimization subsystem 212/400 may use its communication subsystem 408 to communicate with the workload manager subsystem 202 (e.g., via its communication subsystem 312.) For example, the workload management engine 304 may communicate job queue information (e.g., a number of jobs in the job queue 308, a rate of jobs being processed from the job queue 308, a rate of jobs being added to the job queue 308, a time period jobs are in the job queue 308, types of jobs in the job queue 308, and other job queue information and job processing information known in the art) to the workload resource optimization engine 404. In a specific example, the workload resource optimization engine 404 may include a workload manager module 404a that is configured to communicate with the API 304a of the workload management engine 304 to monitor the workload manager subsystem 202 and/or the job queue 308. In various examples, the workload manager module 404a is configured to communicate with a plurality of different workload manager subsystem APIs such that the workload resource optimization subsystem 212 may interface with a plurality of different workload manager subsystems within the workload optimization system 200. In other examples of block 702, the workload resource optimization subsystem 212 is configured to retrieve and/or receive job queue information from the job queue 308 of the workload manager subsystem 202. The workload manager subsystem 202 may persist job queue information in the storage subsystem in order to provide tolerance for the workload manager subsystem 202 restarting or failing with jobs still in the job queue, which may in turn be accessible by the workload resource optimization engine 404. While specific examples of monitoring the job queue 308 of the workload manager subsystem are discussed above, one of skill in the art in possession of the present disclosure will recognize that a variety of different job queue information gathering techniques may be utilized at block 702 while remaining within the scope of the present disclosure.

The method 700 then proceeds to block 704 where the agent infrastructure subsystem is monitored. In an embodiment, at block 704 the workload resource optimization subsystem 212 monitors the agent infrastructure subsystem 204. For example, the workload resource optimization subsystem 212/400 may use its communication subsystem 408 to communicate with the container hosts 206 and/or the agent infrastructure subsystem 204 (e.g., via their communication subsystem 518/622.) For example, the container host engine 505/603 may communicate container host utilization information to the workload resource optimization engine 404 such as a number of containers per host operating system, a rate of job processing, a number of active container hosts on the agent infrastructure subsystem 204, a number of agents per agent pool, physical resource utilization of the agent infrastructure subsystem 204 and/or the container host 206, and/or other container host utilization information known in the art. In a specific example, the workload resource optimization engine 404 may include a container host module 404b and a container module 410. The container host module 404b may be configured to communicate with the virtual machine engine 606. In various examples, the container host module 404b may be configured to communicate with a plurality of different virtual machine engine APIs such as hypervisors, and/or other virtual machine engines known in the art. Similarly, the container module 410 may be configured to communicate with the container engine 508/608 such that the container module 410 may communicate with a plurality of different container engines (e.g., the container engines provided by Docker (discussed above), Rancher®, Windows Server 2016 Containers, and/or other container engines known in the art. In other examples of block 704, the workload resource optimization subsystem 212 is configured to retrieve and/or receive container host utilization information from the agent infrastructure subsystem 204. While specific examples of monitoring the agent infrastructure subsystem 204 are discussed above, one of skill in the art in possession of the present disclosure will recognize that a variety of different agent infrastructure subsystem information gathering techniques may be utilized at block 704 while remaining within the scope of the present disclosure.

Figure 8A:
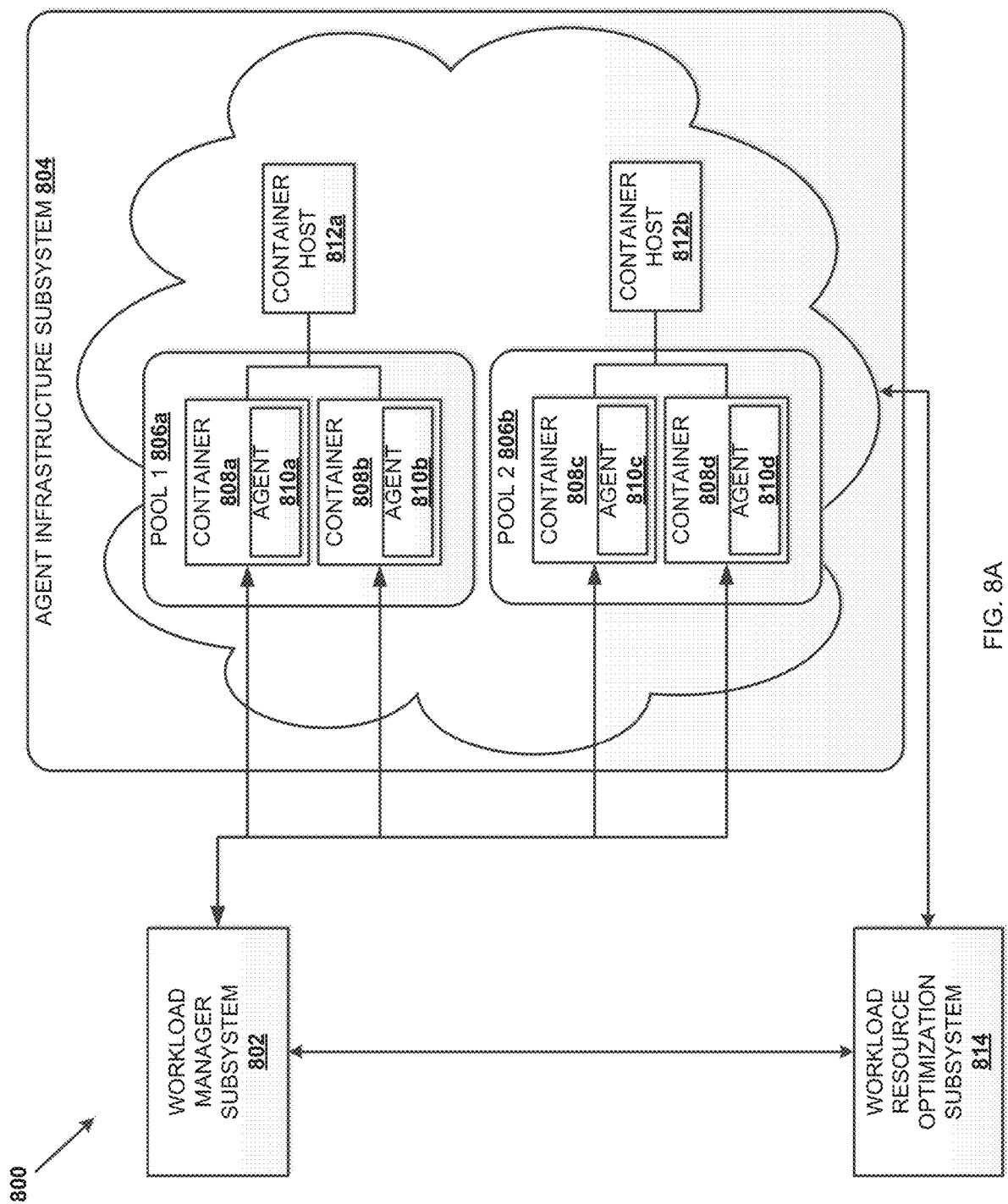
FIG. 8A is a schematic view illustrating an embodiment of the workload optimization system during the method of FIG. 7.
Figure 8B:
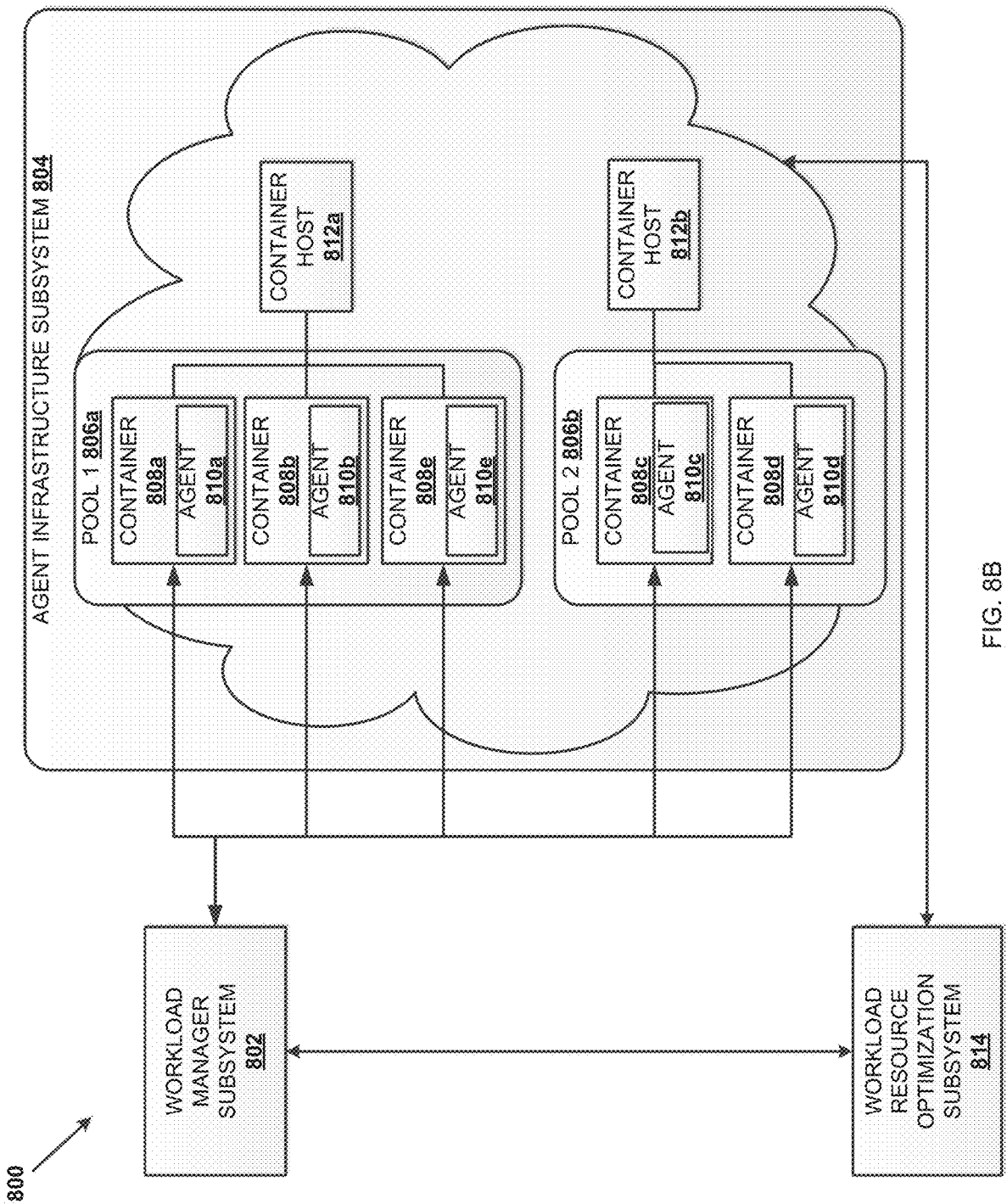
FIG. 8B is a schematic view illustrating an embodiment of the workload optimization system of FIG. 8A adding a container to the agent infrastructure subsystem during the method of FIG. 7.
Figure 8C:
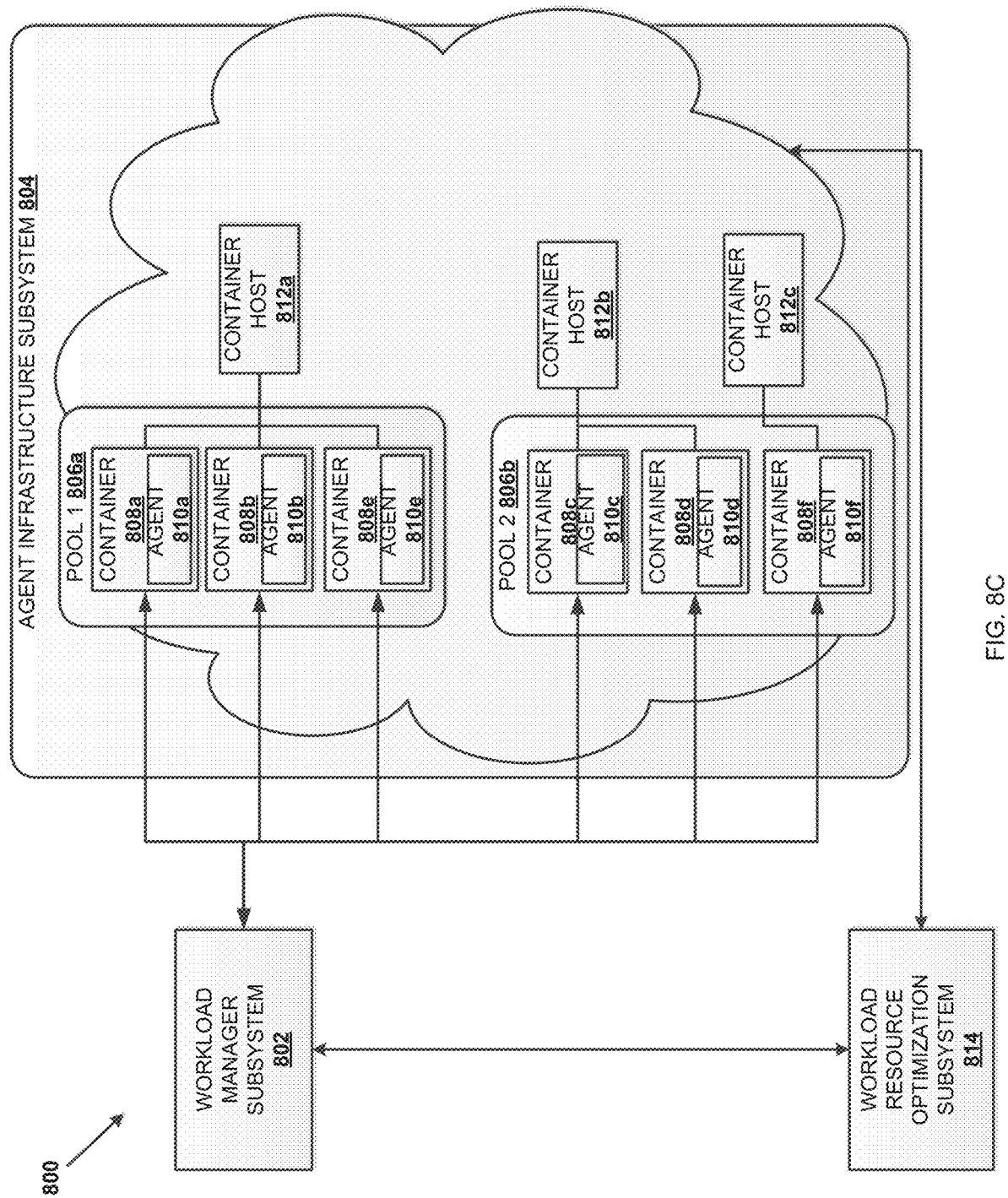
FIG. 8C is a schematic view illustrating an embodiment of the workload optimization system of FIG. 8B adding a container host to the agent infrastructure subsystem of FIG. 8B such that additional containers can be created during the method of FIG. 7.

With reference to FIGS. 8A-8E, embodiments of a workload optimization system 800 are illustrated for reference to the discussion of the method 700. FIG. 8A illustrates an embodiment of a workload optimization system 800 that includes a workload manager subsystem 802 coupled to an agent infrastructure subsystem 804. The agent infrastructure subsystem 804 includes a previously provisioned first agent pool 806a that includes a first container 808a providing a first agent 810a and a second container 808b providing a second agent 810b, with the first agent 810a and the second agent 810b configured to facilitate communication between the workload manager subsystem 802 and the container on which they are hosted for processing jobs from the workload manager subsystem 802 and that meet a similarity threshold that allows those containers 808a and 808b and agents 810a and 810b to be grouped in the first agent pool 806a. For example, a container/agent of an agent pool may include the same minimum prerequisites as other containers/agents in that agent pool and/or may be a container/agent that is scaled or copied from a base image or template for a container/agent of that agent pool. Likewise, the agent infrastructure subsystem 804 includes a previously provisioned second agent pool 806b that includes a third container 808c providing a third agent 810c and a fourth container 808d providing a fourth agent 810d, with the third agent 810c and the fourth agent 810d configured to facilitate communication between the workload manager subsystem 802 and the container on which they are hosted for processing jobs from the workload manager subsystem 802 and that meet a similarity threshold that allows those containers 808c and 808d and agents 810c and 810d to be grouped in the second agent pool 806b. As illustrated, the containers 808a-b of first agent pool 806a are hosted by a first container host 812a, and the containers 808c-d of the second agent pool 806b are hosted by a second container host 812b. However, one of skill in the art will recognize from the teachings of the present disclosure that any number of container hosts may provide containers within each agent pool, and each container host may provide containers in multiple agent pools. For example, in non-illustrated embodiments, the second container host 812b may host the second container 808b in the first agent pool 806a.

In an embodiment, the workload manager subsystem 802 is coupled to each container 808a-d such that the workload manager subsystem 802 may provide jobs to each agent 810a-d that are to be processed by the containers 808a-d hosting that agent. Furthermore, the workload manager subsystem 802 and the agent infrastructure subsystem 804 are coupled to a workload resource optimization subsystem 814. With reference to blocks 702 and 704 of method 700, the workload resource optimization subsystem 814 may operate to monitor the workload manager subsystem 802 for job queue information and monitors the agent infrastructure subsystem 804 for container host utilization information as described above.

The method 700 then proceeds to block 706 where it is determined whether a job queue satisfies a container generation condition. In an embodiment, at block 706 the workload resource optimization subsystem 212 determines, based on the job queue information received at block 702, whether the job queue 308 satisfies a container generation condition that indicates the jobs generated by the workload manager subsystem 202 are not being processed in a desired manner by the agent infrastructure subsystem 204. For example, the workload resource optimization subsystem 212 may include a plurality of predetermined container generation conditions that indicate whether the jobs generated by the workload manager subsystem 202 are being processed according to a desired standard and, if not, whether the agent infrastructure subsystem 204 requires more containers with more agents to process the jobs in the job queue of the workload manager subsystem 202. The workload resource optimization subsystem 212 may compare the job queue information to the container generation conditions that may be based on thresholds for a number of jobs in the job queue 308, a rate of jobs being processed from the job queue 308, a rate of jobs being added to the job queue 308, a time period that jobs are in the job queue 308, a number of jobs in the job queue 308 per agent pool, and/or other job queue thresholds/conditions or combinations of job queue thresholds/conditions that would be apparent to one of skill in the art in possession of the present disclosure.

If, at block 706, the job queue does not satisfy a container generation condition, the method 700 proceeds to block 708 where it is determined whether the job queue satisfies a container decommission condition. In an embodiment, at block 708 the workload resource optimization subsystem 212 determines whether the job queue satisfies the container decommission condition. For example, the container generation condition may be satisfied if the job queue is at or above a predefined number of jobs for a predefined period of time, while the container decommission condition may be satisfied if the job queue is at or below the predefined number of jobs for a predefined period of time. The predefined periods of time may be selected and used with the predefined number of jobs in the job queue 308 to prevent generating and decommissioning of containers on the agent infrastructure system if the job queue is intermittently going above or below the predefined number of jobs. In some embodiments, the generation of containers may require several minutes, so the use of the predefined period of time that is variable with respect to the container decommission condition will prevent decommissioning of containers and/or agents when the job queue is intermittently going above or below the predefined number of jobs. If, at block 708, the job queue does not satisfy the container decommission condition, the method 700 will return to block 702 to continue to monitor the job queue. While specific examples of container generation conditions and container decommission conditions are described, one of skill in the art in possession of the present disclosure will recognize that other container generation conditions and container decommission conditions that indicate the need for more or fewer containers and/or agents on an agent infrastructure subsystem will fall within the scope of the present disclosure as well.

Returning to block 706, if the job queue satisfies the container generation condition, the method 700 then proceeds to block 710 where a container is generated. In an embodiment, at block 710 the workload resource optimization subsystem 212 communicates container instructions to the agent infrastructure subsystem 204 to generate a container that includes agents and that are configured to process the jobs that are in the job queue 308 of the workload manager subsystem 202. For example, the container module 404c may be configured to communicate (through a network via the communication subsystem 408) the container instructions to generate a new container at the agent infrastructure subsystem 204 (e.g., via its communication subsystem 518/622) such that the container engine 508/608 of the container host engine 505/603 receives the container instructions. The container module 404c may be configured to communicate with an API of the container engine 508/608 and configured to communicate with other APIs of other container engines. The container instructions may include instructions to the agent infrastructure subsystem 204 to generate one or more containers needed to process a set of jobs in the job queue 308 along with their corresponding agent. For example, the container instructions may be a command line (e.g., 'docker-compose-f container-spec.yml' which would instantiate a container based on the container-spec.yml data file by the Docker® container engine). In an example, the workload resource optimization engine 404 may have determined, in response to monitoring the job queue 308, that a particular job type associated with an agent pool makes up the greatest portion of the plurality of jobs in the job queue. In another example, the workload resource optimization engine 404 may have determined, in response to monitoring the job queue 308, that a particular job type associated with an agent pool has the highest priority over other job types of jobs in the job queue 308. In yet another example, each agent pool may be associated with a job queue and the workload resource optimization engine 404 may have determined, in response to monitoring that job queue, that the job queue has satisfied a job threshold. At block 706, the workload resource optimization subsystem 212 may provide the container instructions that identify an agent pool that needs a new container and agent to process the job(s) in the job queue 308, and provide instructions to generate a new container to the agent infrastructure subsystem 204.

At block 706, the agent infrastructure subsystem 204 may receive the container instructions from the workload resource optimization subsystem 212 and determine whether an agent pool for the container and agent identified by the container instructions exists on the agent infrastructure subsystem 204. For example, if agent pool A is associated with a 'container-spec-A.yml' file, then the container instructions may include a 'docker-compose-f container-spec-A.yml' command. If the identified agent pool exists, the container engine 508/608 may create a container for that agent pool (e.g., the agent pool 210) and provision an agent for the agent pool 210 in the container. When provisioning the container and agent for the agent pool 210 in the container, the container engine 508/608 may retrieve an image for the container and agent from the container image cache 516/620. For example, the container engine 508/608 may use the 'container-spec-A.yml' file to provision a container and its agent. The agent infrastructure subsystem 600 may then communicate container and agent information for the provisioned container and agent to the workload resource optimization subsystem 212 such that the workload resource optimization subsystem 212 can register the newly provisioned container and agent in the agent registry 310 of the workload manager subsystem 202. For example, the workload resource optimization subsystem 212 may include any addresses and port numbers of the agent as well as the associated agent pool with the workload manager subsystem 202 If the identified agent pool does not exist, the container engine 508/608 may query the container image cache 516/620 to determine whether an image of a container identified by the container instructions is stored in the container image cache 516/620. If the image of the identified container exists in the container image cache 516/620, then the container engine 508/608 may create a new container form the image, provision an agent associated with the container from the image stored in the container image cache 516/620, and communicate agent information to the workload resource optimization subsystem 212 for registration of the newly provisioned container and agent in the agent registry 310 of the workload manager subsystem 202. If the image of the identified container and agent does not exist in the container image cache 516/620, the workload resource optimization subsystem 212 may notify a user that a container image needs to be created for the particular workload. While a newly provisioned agent pool that includes a container and a hosted agent from the container image cache 516/620 may take 10-15 minutes to provision, along with another 3-4 minutes to register at the workload manager subsystem 202, subsequent container generation and agent provisioning of images of the container and agent in the container image cache 516/620 may take 5-6 seconds, in addition to the 3-4 minutes to register the container and agent at the workload manager subsystem 202. This may be compared to the conventional provisioning an agent on a virtual machine, which may take 13-19 minutes to generate the virtual machine, provision the agent, and register the agent with the workload manager subsystem 202.

With reference to the specific example of workload resource optimizations illustrated in FIGS. 8A-8E, FIG. 8B illustrates the example workload optimization system 800 provided according to block 710. In the illustrated example, the workload resource optimization subsystem 814 has determined that the job queue of the workload manager subsystem 802 of FIG. 8A satisfies a container generation condition with respect to block 706 of method 700. As discussed above, in response, the workload resource optimization subsystem 814 communicates container instructions to the agent infrastructure subsystem 804. The agent infrastructure subsystem 804 then determines from the container instructions that the first agent pool 806a needs an agent and a container to process the jobs in the job queue of the workload manager subsystem 802, and the container engine may then create (using the first container host 812a) a fifth container 808e and provision a fifth agent 810e for the first agent pool 806a. In a non-illustrated embodiment, the container engine may create (using the second container host 812b) the fifth container 808e and provision the fifth agent 810e for the first agent pool 806a. As discussed above, the fifth container 808e and the fifth agent 810e may be substantially similar to the first container 808a and first agent 810a and the second container 808b and the second agent 810b when included in the first agent pool 806a. The agent infrastructure subsystem 804 may then communicate agent information back to the workload resource optimization subsystem 814 such that the workload resource optimization subsystem 814 registers the fifth agent 810e with the workload manager subsystem 802, which allows the jobs in the job queue on the workload manager subsystem 802 that are associated with the first agent pool 806a to be processed by the fifth container 808e.

The method 700 then proceeds to block 714 where it is determined whether container host utilization satisfies a container host activation condition. In an embodiment, at block 714 the workload resource optimization subsystem 212 determines whether the resource utilization of the container host 206 satisfies a container host activation condition that is based on the container host utilization information retrieved from the agent infrastructure subsystem 204 in response to the monitoring performed at block 704. For example, the container host activation condition may be based on the hardware/virtual resources of the container host 206 that are consumed by existing containers 208a-b, a number of containers hosted by the container host 206, the rate at which containers are being created on the container host 206 and/or the agent infrastructure subsystem 204, a duration that a particular container host utilization is above a container host utilization threshold, and/or other container host thresholds/conditions that would be apparent to one of skill in the art in possession of the present disclosure. Because a container host 206 may take longer to activate relative to the generation of a container by the container host 206, the container host activation condition may be defined such that a new container host is given enough time to activate before the container host 206 reaches its maximum container hosting capabilities. If the container host utilization does not satisfy a container host activation condition at block 714, then the method 700 proceeds to block 716, discussed further below.

If the container host utilization satisfies a container host activation condition at block 714, the method 700 proceeds to block 718 where a container host is activated. In an embodiment, at block 718 the workload resource optimization subsystem 212 responds to container host utilization information satisfying the container host activation condition by providing container host instructions to the agent infrastructure subsystem 204 to activate a container host. For example, the container host module 404b may be configured to communicate (e.g., through a network via its communication subsystem 408) the container host instructions to activate a container host at the agent infrastructure subsystem 204 (e.g., via its communication subsystem 518/622) such that the container host engine 505/603 receives the container host instructions. The container host module 404b may be configured to communicate with an API of the container host engine 505/603 and/or the virtual machine engine 606, and/or to communicate with other APIs of other container host engines. The container instructions may include instructions for a container host to be activated and/or created by the agent infrastructure subsystem 204 to provide physical and/or virtual resources to new containers. Based on whether the agent infrastructure subsystem 204 includes physical container hosts and/or virtual container hosts, the agent infrastructure subsystem 204 may use the container host engine 505 to activate (e.g., boot) a new physical container host that includes the operating system 506 from which any new containers can be provisioned, and/or the virtual machine engine 606 may generate a new virtual machine acting as a container host that includes an operating system from which a container can be provisioned. The method then proceeds back to block 702 to monitor the job queue.

With reference to the specific example of the workload resource optimizations in FIGS. 8A-8E, FIG. 8C illustrates the example workload optimization system 800 upon the performance of block 718 of the method 700. In the specific example, the workload resource optimization subsystem 814 has determined that the container host utilization information from the agent infrastructure subsystem 804 satisfies a container host activation condition at block 714 of method 700. The workload resource optimization subsystem 814 then communicates container host instructions to the agent infrastructure subsystem 804. The agent infrastructure subsystem 804 may determine from the container host instructions that more container hosts are needed to provide containers to process jobs generated by the workloads provided by the workload manager subsystem 802. The container host engine/virtual machine engine of the agent infrastructure subsystem 804 may then activate and/or generate a third container host 812c. For example, the third container host 812c may be an activated physical computing device that includes an operating system from which containers may be provisioned, and/or a virtual machine that includes an operating system from which containers may be provisioned and that is generated from hardware and/or an operating system of the agent infrastructure subsystem 804. The method 700 may then return to 702 to repeat the method 700, and at block 710 of that repeat of the method 700, a sixth container 808*f* may be generated that includes a sixth agent 810*f* in the second agent pool 806*b*. As illustrated, the sixth container 808*f* may be hosted by the third container host 812*c*.

Returning to block 708, if the job queue satisfies the container decommission condition, then the method 700 proceeds to block 712 where a container is decommissioned. In an embodiment, at block 712 the workload resource optimization subsystem 212 communicates container instructions to the agent infrastructure subsystem 204 to decommission a container that processes the jobs that are in the job queue 308 of the workload manager subsystem 202. For example, the container module 404*c* may be configured to communicate (e.g., through a network via its communication subsystem 408) the container instructions to decommission an existing container at the agent infrastructure subsystem 204 (e.g., via its communication subsystem 518/622) such that the container engine 508/608 of the container host engine 505/603 receives the container instructions. The container module 404*c* may be configured to communicate with an API of the container engine 508/608 and configured to communicate with other APIs of other container engines.

The container instructions may include instructions to decommission a container and an agent in the agent infrastructure subsystem 204 that processes a set of jobs for the job queue 308. For example, the workload resource optimization engine 404 may have determined, in response to monitoring the job queue 308, that a particular job type associated with an agent pool makes up the least number of the plurality of jobs in the job queue, or has no jobs in the job queue. In another example, the workload resource optimization engine 404 may have determined, in response to monitoring the job queue 308, that a particular job type associated with an agent pool has the lowest priority over other job types of the plurality of jobs in the job queue 308. The workload resource optimization subsystem 212 may then provide the container instructions that identify the agent pool that does not need the existing number of containers and agents to process the jobs in the job queue 308 and, in response, provides instructions to decommission an existing container in the agent infrastructure subsystem 204 that provides the unnecessary container(s) and agent(s). The agent infrastructure subsystem 204 may receive the container instructions from the workload resource optimization subsystem 212 and identify the agent pool that does not need all of its agents and containers to process the jobs generated by the workload manager subsystem 202. The container engine 508/608 may then decommission container(s) and respective agent(s) in the agent pool identified by the container instructions, or select container(s) and respective agent(s) to decommission based on decommissioning criteria (e.g., the first container created may be the first container decommissioned, based on processing capabilities of each agent/container, idle containers may be decommissioned over active containers, and/or other decommission criteria that would apparent to one of skilled in the art in possession of the present disclosure). For example, the container engine 508/608 may decommission an idle container and its associated agent from an agent pool that is identified by the container instructions. In another example, the container engine 508/608 may receive instructions to decommission a container and its associated agent from an agent pool, and the container engine 508/608 may then select which agent(s) in the agent pool to decommission based on the decommissioning criteria. The agent infrastructure subsystem 204 may then communicate agent information associated with the decommissioned agent to the workload resource optimization subsystem 212 such that the workload manager subsystem 202 removes the decommissioned agent from the agent registry 310.

With reference to the specific example of workload resource optimizations in FIGS. 8A-8E, FIG. 8D illustrates the example workload optimization system 800 with respect to block 712. In the specific example, the workload resource optimization subsystem 814 determines that the job queue of the workload manager subsystem 802 of FIG. 8A satisfies a container decommission condition at block 708 of method 700. The workload resource optimization subsystem 814 then communicates container instructions to the agent infrastructure subsystem 804. The agent infrastructure subsystem 804 may determine from the container instructions that the second agent pool 806*b* does not need both the third container 808*c* and the fourth container 808*d* to process the jobs on the job queue of the workload manager subsystem 802. In response, the container engine on the agent infrastructure subsystem 804 may then use the second container host 812*b* to decommission the fourth container 808*d* that includes the fourth agent 810*d*. In selecting between the third container 808*c* and the fourth container 808*d*, the container engine may have determined that the third container 808*c* is processing a job while the fourth container 808*d* is not processing any jobs. The agent infrastructure subsystem 804 may then communicate agent information associated with the fourth agent 810*d* back to the workload resource optimization subsystem 814 such that the workload resource optimization subsystem 814 deregisters the fourth agent 810*d* from the agent registry of the workload manager subsystem 802 so that the jobs in the job queue on the workload manager subsystem 802 are not sent to the decommissioned fourth container 808*d* and its fourth agent 810*d*.

The method 700 then proceeds to block 716, where it is determined whether the container host utilization satisfies the container host deactivation condition. In an embodiment, at block 716 the workload resource optimization subsystem 212 determines whether the resource utilization of the container host 206 satisfies a container host deactivation condition, which may be predefined and based on the container host utilization information that was retrieved based on the monitoring at block 704 and stored in the agent infrastructure subsystem 204. For example, the container host deactivation condition may be based on the hardware/virtual resources of the container host 206 consumed by existing containers 208*a-b*, a number of containers hosted by the container host 206, the rate at which containers are being created or decommissioned on the container host 206 and/or the agent infrastructure subsystem 204, a duration that a particular container host utilization is below a container host utilization threshold, and/or other container host thresholds and container host conditions that would be apparent to one of skill in the art in possession of the present disclosure. If the container host utilization does not satisfy the container host deactivation condition at block 716, then the method 700 returns to block 702 to monitor the job queue.

If the container host utilization satisfies the container host deactivation condition at block 716, then the method 700 then proceeds to block 720 where a container host is deactivated. In an embodiment, the workload resource optimization subsystem 212 responds to container host utilization information satisfying the container host deactivation condition by providing container host instructions to the agent infrastructure subsystem 204 to deactivate a container host. The container host instructions may include instructions for a container host to be deactivated by the agent infrastructure subsystem 204. Based on whether the agent infrastructure subsystem 204 includes physical container hosts and/or virtual container hosts, the agent infrastructure subsystem 204 may deactivate a physical container host (e.g., the container host 502) and/or a virtual container host (e.g., the virtual machines 612a-b). Any active containers that include an agent on a container host that is deactivated at block 720 may be transferred to an active container host such that that active container host may provide that container and the agent that were on the container host that is deactivated. The method 700 then proceeds back to block 702 to monitor the job queue.

Figure 8D:
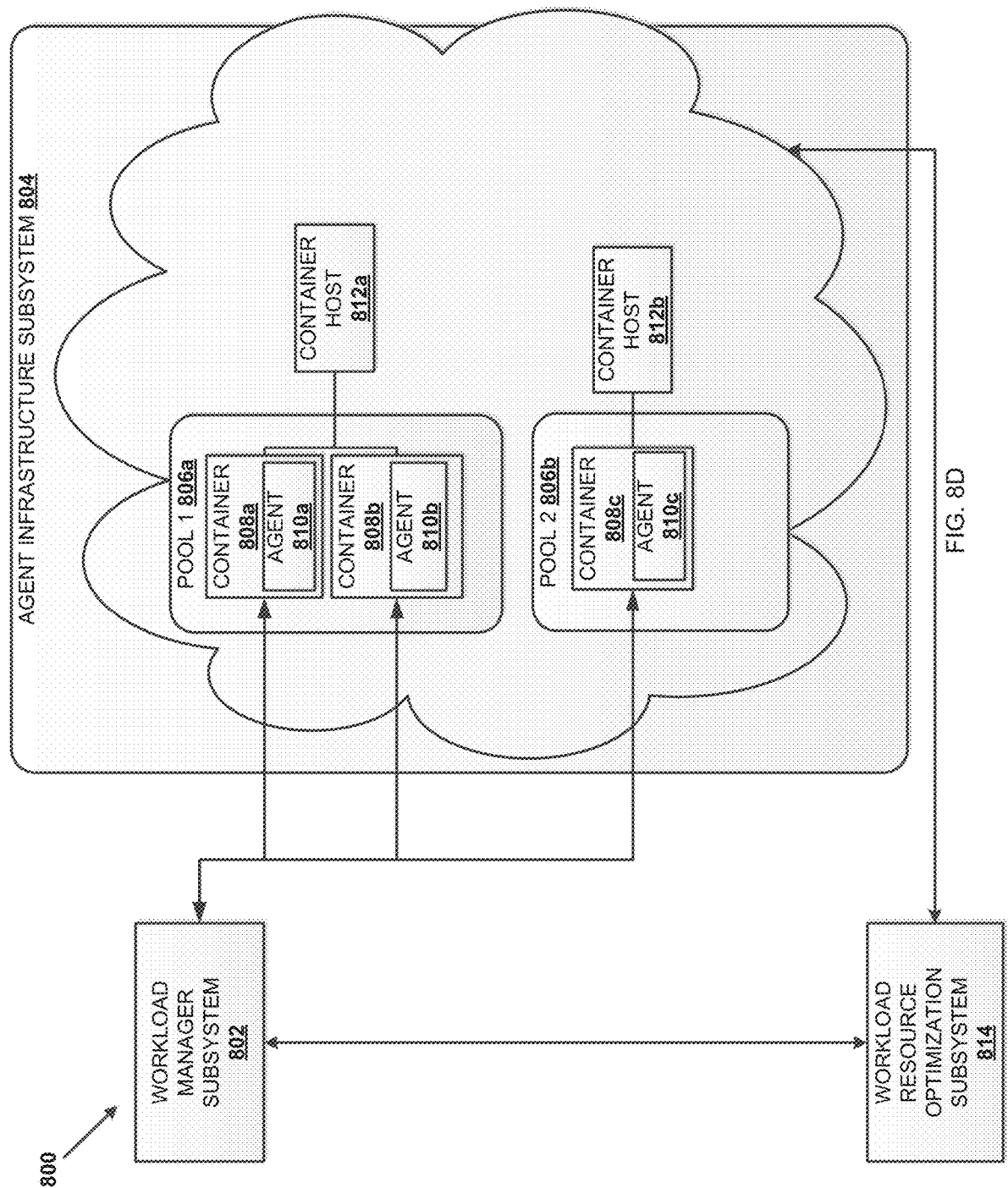
FIG. 8D is a schematic view illustrating an embodiment of the workload optimization system of FIG. 8A removing a container from the agent infrastructure subsystem during the method of FIG. 7.

With reference to the specific example of workload resource optimizations in FIGS. 8A-8E, FIG. 8E illustrates the workload optimization system 800 at block 720. In the specific example, the workload resource optimization subsystem 814 determines that the container host utilization information for the agent infrastructure subsystem 804 of FIG. 8D satisfies the container host deactivation condition at block 718 of method 700. The workload resource optimization subsystem 814 then communicates container host instructions to the agent infrastructure subsystem 804. The agent infrastructure subsystem 804 may determine from the container host instructions that fewer container hosts are needed to provide the containers 808a-c that provide agents 810a-c to process jobs from the workload manager subsystem 202 after the fourth container 808d (illustrated in FIG. 8A) has been decommissioned (as illustrated in FIG. 8D.) The container host engine may then deactivate the second container host 812b of FIG. 8D. In a specific example, before, during, or after the process of deactivating the second container host 812b, the container engine of the first container host 812a may generate the third container 808c and provision the third agent 810c, and the workload resource optimization subsystem 814 may register the third agent 810c (which was previously hosted by the second container host 812b) with an agent registry of the workload manager subsystem 802. In another example, the second container host 812 may only be deactivated when there are no containers being hosted by the second container host.

Thus, systems and methods have been described that provide a workload optimization system that includes a workload resource optimization subsystem that monitors both a job queue of jobs generated by workloads provided by a workload manager subsystem, as well as container host utilization by an agent infrastructure subsystem. The workload resource optimization subsystem provides first tier scaling of container hosts (which include physical and/or virtual machines provided on the agent infrastructure subsystem) and second tier scaling of containers (which are created from the container hosts and which provide the agents in each container that facilitate communications between the workload resource optimization subsystem and its container such that that container processes jobs in the job queue.) As such, agents are provisioned from containers to allow fast spin up and registration times of agents, which allows for a workload processing system that does not require customized fixed agents that are provisioned on separate hardware resources. The workload optimization system saves resources by requiring a smaller hardware footprint than conventional agent infrastructure systems. For example, an agent infrastructure subsystem may be provided by a single hardware device that can provide a plurality of virtual machines that can each host a plurality of containers on which a customized agent can be provisioned, and that agent infrastructure subsystem may be instructed by the workload resource optimization system to dynamically remove and add containers providing agents, and virtual machines acting as container hosts, to meet changing workload demands on the workload manager subsystem.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A workload optimization system, comprising:
a workload manager subsystem that is configured to provide a plurality of workloads that are each configured to generate a job when executed, wherein the workload management system includes an agent registry that:
identifies a plurality of available agents that are each configured to execute a job having job requirements; and
includes agent registrations having:
agent information for each of the plurality of available agents that is configured for use in assigning a job to that agent; and
agent address information for each of the plurality of available agents that is configured for use in providing a job to that agent when that job is assigned to that agent;
an agent infrastructure subsystem that is coupled to the workload manager subsystem and that includes a first container host that is configured to provide a first container having a first agent that is included in the plurality of available agents and that is configured to process a job generated by at least one of the plurality of workloads, wherein the first agent facilitates communications of the job between the first container and the workload manager subsystem, and wherein the agent infrastructure subsystem registers agents with the workload manager subsystem; and
a workload resource optimization subsystem that is coupled to the workload manager subsystem and the agent infrastructure subsystem, wherein the workload resource optimization subsystem is configured to:
monitor a job queue of jobs that were generated by the plurality of workloads and that are to be processed by the first container via the first agent;
determine that the job queue satisfies a container generation condition and, in response, provide instructions to the first container host to retrieve a second container image from a container image cache, retrieve a second agent image from the container image cache, and use the second container image and the second agent image to generate a second container that includes a second agent;
communicate second agent information and second agent address information from the agent infrastructure subsystem to the workload manager subsystem for registration of the second container and the second agent in the agent registry;

monitor a first container host utilization of the first container host that is based at least in part on a container utilization of the first container and the second container; and determine the first container host utilization of the first container host satisfies a container host activation condition that is based on a time required to activate a new container host before the first container host reaches a maximum container hosting capability and, in response, provide instructions to the agent infrastructure subsystem to activate a second container host that is configured to provide a third container having a third agent.

2. The workload optimization system of claim 1, wherein the workload resource optimization subsystem is configured to:

monitor a second container host utilization of the second container host that is based at least in part on a container utilization of the third container; and determine the first container host utilization of the first container host and the second container host utilization of the second container host satisfy a container host deactivation condition and, in response, provide container host instruction to the agent infrastructure subsystem to cause the agent infrastructure subsystem to:

transfer agents from the second container host to at least one container provided by the first container host; and deactivate the second container host.

3. The workload optimization system of claim 1, wherein the workload resource optimization subsystem is configured to:

determine that the job queue satisfies a container decommission condition and, in response, decommission at least one of the first container, the second container, and the third container.

4. The workload optimization system of claim 1, wherein at least one of the first container host and the second container host is emulated by a virtual machine operated by a virtual machine engine that is included on a physical computing device.

5. The workload optimization system of claim 1, wherein the workload manager subsystem includes a first workload manager and a second workload manager, and wherein the workload resource optimization subsystem is configured to:

monitor the job queue of jobs that were generated by the plurality of workloads on the first workload manager and the second workload manager that are to be processed by the first container and the second container; and determine that the job queue of jobs that were generated by the plurality of workloads on the second workload manager satisfies the container generation condition and, in response, provide instructions to the second container host to generate a fourth container that includes a fourth agent and that is configured to process the jobs that were generated by the plurality of workloads on the second workload manager.

6. The workload optimization system of claim 1, wherein the first agent and the second agent are grouped in a first agent pool that is configured to execute at least one job.

7. An information handling system (IHS), comprising:
a communication system;
a processor that is coupled to the communication system; and
a non-transitory memory that is coupled to the processor and that includes instructions that, when executed by the processor, cause the processor to provide a workload resource optimization engine that is configured to:

monitor job queue information for a job queue of jobs that are generated by a plurality of workloads and that are included on a workload manager subsystem that includes an agent registry that:

identifies a plurality of available agents that are each configured to execute a job having job requirements; and includes agent registrations having:

agent information for each of the plurality of available agents that is configured for use in assigning a job to that agent; and agent address information for each of the plurality of available agents that is configured for use in providing a job to that agent when that job is assigned to that agent;

monitor first container host utilization information for a first container host that is included on an agent infrastructure subsystem, that provides a first container having a first agent, and that processes a job generated by at least one of the plurality of workloads;

determine from the job queue information that the job queue satisfies a container generation condition and, in response, provide first instructions to the first container host to retrieve a second container image from a container image cache, retrieve a second agent image from the container image cache, and use the second container image and the second agent image to generate a second container that includes a second agent;

communicate second agent information and second agent address information from the agent infrastructure subsystem to the workload manager subsystem to cause the workload manager subsystem to register the second container and the second agent in the agent registry; and determine, subsequent to the providing the first instructions to the first container host to generate the second container, that the first container host utilization information for the first container host satisfies a container host activation condition that is based on a time required to activate a new container host before the first container host reaches a maximum container hosting capability and, in response, provide second instructions to the agent infrastructure subsystem to activate a second container host to provide a third container having a third agent.

8. The IHS of claim 7, wherein the workload resource optimization engine is configured to:

monitor second container host utilization information of the second container host that is based at least in part on a container utilization of the third container;

determine the first container host utilization information of the first container host and the second container host utilization information of the second container host satisfy a container host deactivation condition and, in response, provide container host instruction to the agent infrastructure subsystem to cause the agent infrastructure subsystem to:

transfer agents from the second container host to at least one container provided by the first container host; and deactivate the second container host.

9. The IHS of claim 7, wherein the workload resource optimization engine is configured to:

determine that the job queue satisfies a container decommission condition and, in response, decommission at least one of the first container, the second container, and the third container.

10. The IHS of claim 7, wherein at least one of the first container host and the second container host is emulated by a virtual machine operated by a virtual machine engine that is included on a physical computing device.

11. The IHS of claim 7, wherein the workload manager subsystem includes a first workload manager and a second workload manager, and wherein the workload resource optimization engine is configured to:
    monitor the job queue of jobs that were generated by the plurality of workloads on the first workload manager and the second workload manager and that are to be processed by the first container and the second container; and
    determine that jobs that are included in the job queue of jobs and that were generated by the plurality of workloads on the second workload manager satisfy the container generation condition and, in response, provide third instructions to the second container host to generate a fourth container that includes a fourth agent and that is configured to process the jobs that were generated by the plurality of workloads on the second workload manager.

12. The IHS of claim 7, wherein the first agent and the second agent are grouped in a first agent pool that is configured to execute at least one job.

13. A method for workload resource optimization, comprising:
    monitoring, by a workload resource optimization subsystem, a job queue of a plurality of jobs that are included on a workload manager subsystem and that are generated by at least one workload on the workload manager subsystem, wherein the workload manager subsystem includes an agent registry that:
        identifies a plurality of available agents that are each configured to execute a job having job requirements; and
        includes agent registrations having:
            agent information for each of the plurality of available agents that is configured for use in assigning a job to that agent; and
            agent address information for each of the plurality of available agents that is configured for use in providing a job to that agent when that job is assigned to that agent;
    monitoring, by the workload resource optimization subsystem, first container host utilization information for a first container host that is included on an agent infrastructure subsystem, that provides a first container having a first agent, and that processes a job generated by at least one of the plurality of workloads, wherein the first agent facilitates communications of the execution of the job between the first container and the workload manager subsystem;
    determining, by the workload resource optimization subsystem, that the job queue satisfies a container generation condition and, in response, providing instructions to the first container host to retrieve a second container image from a container image cache, retrieve a second agent image from the container image cache, and use the second container image and the second agent image to generate a second container that includes a second agent;
    communicating, by the workload resource optimization subsystem, second agent information and second agent address information from the agent infrastructure subsystem to the workload manager subsystem to cause the workload manager subsystem to register the second container and the second agent in the agent registry;
    monitoring, by the workload resource optimization subsystem, second container host utilization information of the first container host that is based at least in part on a container utilization of the first container and the second container; and
    determining, by the workload resource optimization subsystem, the first container host utilization of the first container host satisfies a container host activation condition that is based on a time required to activate a new container host before the first container host reaches a maximum container hosting capability and, in response, providing instructions to the agent infrastructure subsystem to activate a second container host that is configured to provide a third container having a third agent.

14. The method of claim 13, further comprising:
    monitoring, by the workload resource optimization subsystem, a second container host utilization of the second container host that is based at least in part on a container utilization of the third container;
    determining, by the workload resource optimization subsystem, the first container host utilization of the first container host and the second container host utilization of the second container host satisfy a container host deactivation condition and, in response, providing container host instruction to the agent infrastructure subsystem to cause the agent infrastructure subsystem to:
        transfer, by the workload resource optimization subsystem, agents from the second container host to at least one container provided by the first container host; and
        deactivate, by the workload resource optimization subsystem, the second container host.

15. The method of claim 13, further comprising:
    determining, by the workload resource optimization subsystem, that the job queue satisfies a container decommission condition and, in response, decommissioning at least one of the first container, the second container, and the third container.

16. The method of claim 13, wherein at least one of the first container host and the second container host is emulated by a virtual machine operated by a virtual machine engine that is included on a physical computing device.

17. The method of claim 13, further comprising:
    monitoring, by the workload resource optimization subsystem, the job queue of jobs that were generated by the plurality of workloads on a first workload manager and a second workload manager that are to be processed by the first container and the second container, wherein the workload manager subsystem includes the first workload manager having a first application programming interface (API) and the second workload manager having a second API; and
    determining, by the workload resource optimization subsystem, that the job queue of jobs that were generated by the plurality of workloads on the second workload manager satisfies the container generation condition and, in response, providing instructions to the second container host to generate a fourth container that includes a fourth agent and that is configured to process the jobs that were generated by the plurality of workloads on the second workload manager.

\* \* \* \* \*